(12) United States Patent
Zhi et al.

(10) Patent No.: US 10,749,447 B2
(45) Date of Patent: Aug. 18, 2020

(54) ELECTRICAL APPARATUS AND A METHOD FOR FABRICATING AN ELECTRICAL APPARATUS

(71) Applicant: City University of Hong Kong, Kowloon (HK)

(72) Inventors: Chunyi Zhi, Shatin (HK); Minshen Zhu, Tai Wai (HK)

(73) Assignee: City University of Hong Kong, Kowloon (HK)

( * ) Notice: Subject to any disclaimer, the term of this patent is extended or adjusted under 35 U.S.C. 154(b) by 672 days.

(21) Appl. No.: 15/342,294

(22) Filed: Nov. 3, 2016

(65) Prior Publication Data

US 2018/0123481 A1    May 3, 2018

(51) Int. Cl.
| | |
|---|---|
| *H02N 1/04* | (2006.01) |
| *H02N 1/00* | (2006.01) |
| *G01L 9/00* | (2006.01) |
| *H02N 1/08* | (2006.01) |
| *H02N 99/00* | (2006.01) |

(52) U.S. Cl.
CPC .............. *H02N 1/002* (2013.01); *G01L 9/00* (2013.01); *H02N 1/04* (2013.01); *H02N 1/08* (2013.01); *H02N 99/00* (2013.01)

(58) Field of Classification Search
CPC ............................................ H02N 1/00–1/012
USPC ......... 310/300, 309, 310; 200/181; 322/2 A; 318/116
See application file for complete search history.

(56) References Cited

U.S. PATENT DOCUMENTS

| | | | | |
|---|---|---|---|---|
| 9,178,446 | B2* | 11/2015 | Wang | ........................ H02N 1/04 |
| 2011/0050181 | A1* | 3/2011 | Post | ........................ H02N 1/04 |
| | | | | 320/166 |
| 2014/0084748 | A1 | 3/2014 | Wang et al. | |
| 2014/0246950 | A1* | 9/2014 | Wang | ....................... H02N 1/04 |
| | | | | 310/310 |
| 2014/0338458 | A1 | 11/2014 | Wang et al. | |
| 2015/0061460 | A1 | 3/2015 | Bae et al. | |
| 2016/0028327 | A1* | 1/2016 | Aliane | .................. B05D 3/065 |
| | | | | 310/300 |

FOREIGN PATENT DOCUMENTS

WO        2013151590 A2    10/2013

OTHER PUBLICATIONS

Weiqing Yang, Jun Chen, Guang Zhu, Jin Yang, Peng Bai, Yuanjie Su, Qingsheng Jing, Xia Cao, Zhong Lin Wang, "Harvesting Energy from the Natural Vibration of Human Walking", ACS Nano, vol. 7, No. 12, pp. 11317-11324, 2013.
Te-Chien Hou, Ya Yang, Hulin Zhang, Jun Chen, Lih-Juann Chen, Zhong Lin Wang, "Triboelectric nanogenerator built inside shoe insole for harvesting walking energy", Nano Energy, No. 2, pp. 856-862, 2013.

(Continued)

*Primary Examiner* — Thomas Truong
(74) *Attorney, Agent, or Firm* — Renner Kenner Greive Bobak Taylor & Weber

(57) ABSTRACT

An electrical apparatus includes an electrical signal generation structure arranged to generate an electrical signal in response to a change of an external pressure subjected thereto. The electrical signal generation structure includes a fabric material. A method for fabricating such electrical apparatus is also provided.

22 Claims, 22 Drawing Sheets

(56) References Cited

OTHER PUBLICATIONS

Tao Huang, Cheng Wang, Hao Yu, Hongzhi Wang, Qinghong Zhang, Meifang Zhu, "Human walking-driven wearable all-fiber triboelectric nanogenerator containing electrospun polyvinylidene fluoride piezoelectric nanofibers", Nano Energy, No. 14, pp. 226-235, 2015.

Guang Zhu, Peng Bai, Jun Chen, Zhong Lin Wang, Nano Energy, "Power-generating shoe insole based on triboelectric nanogenerators for self-powered consumer electronics", No. 2, pp. 688-692, 2013.

Yue Kang, Bo Wang, Shunge Dai, Guanlin Liu, Yanping Pu, Chenguo Hu, "Folded Elastic Strip-Based Triboelectric Nanogenerator for Harvesting Human Motion Energy for Multiple Applications", ACS applied materials interfaces, No. 7, 20469-20476, 2015.

\* cited by examiner

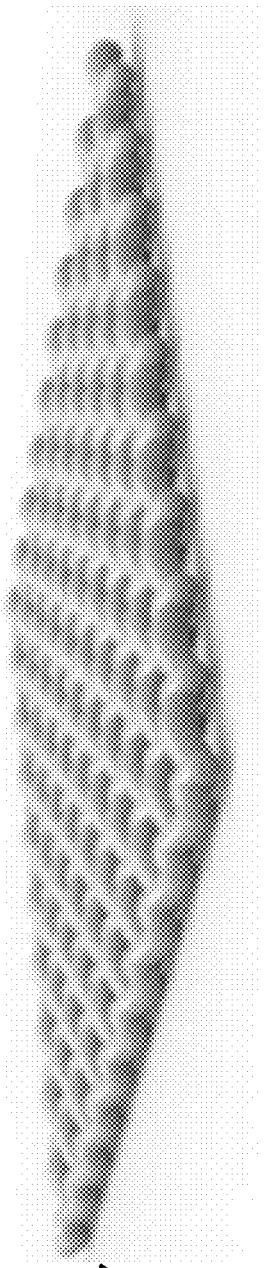
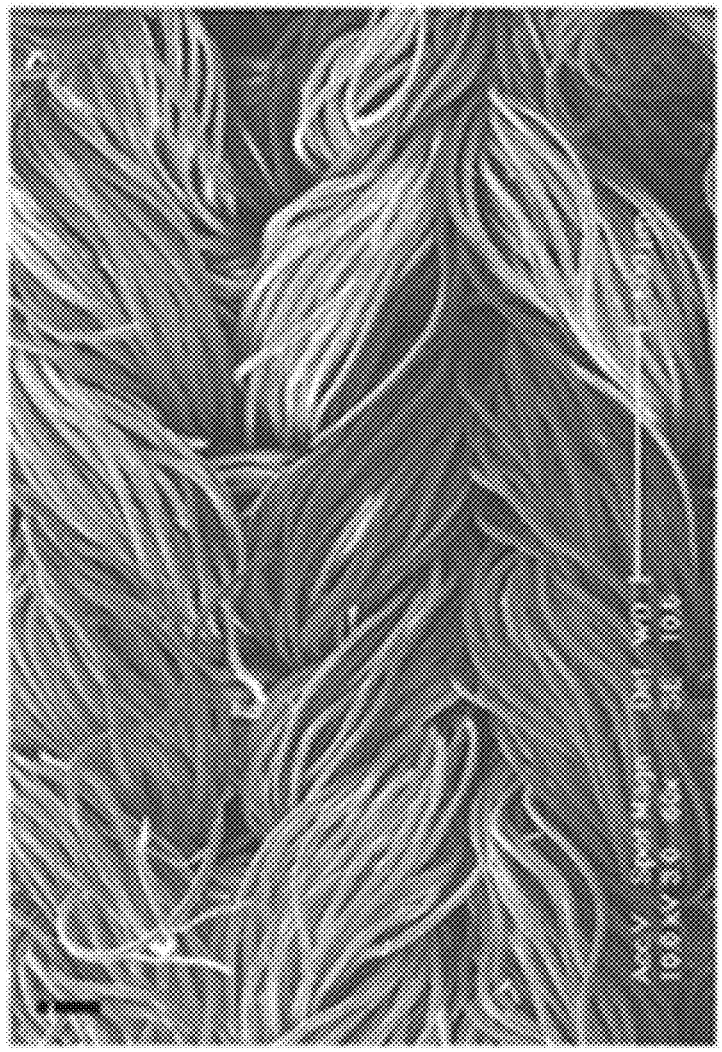
FIG. 2A  104/106
FIG. 2B

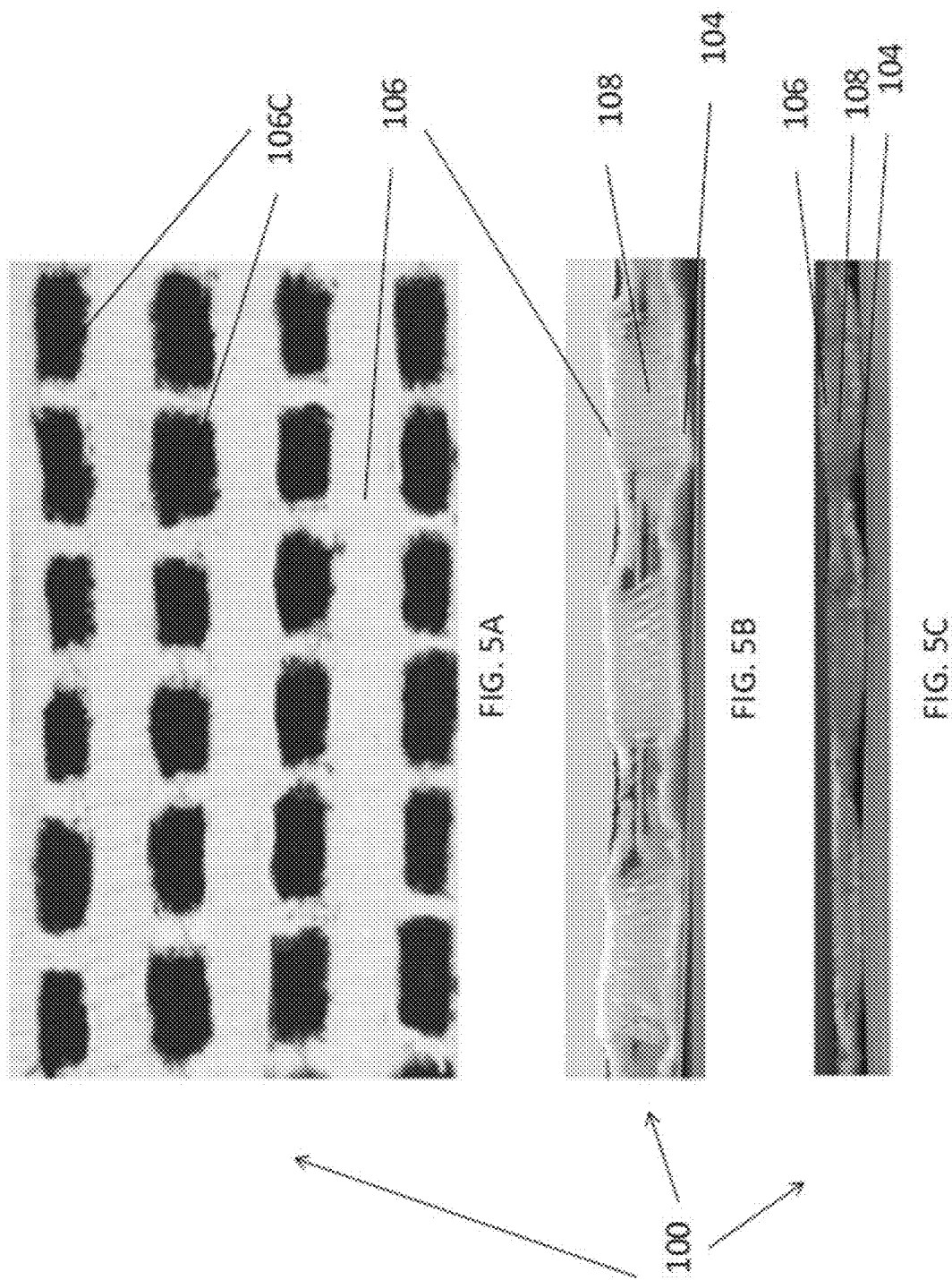

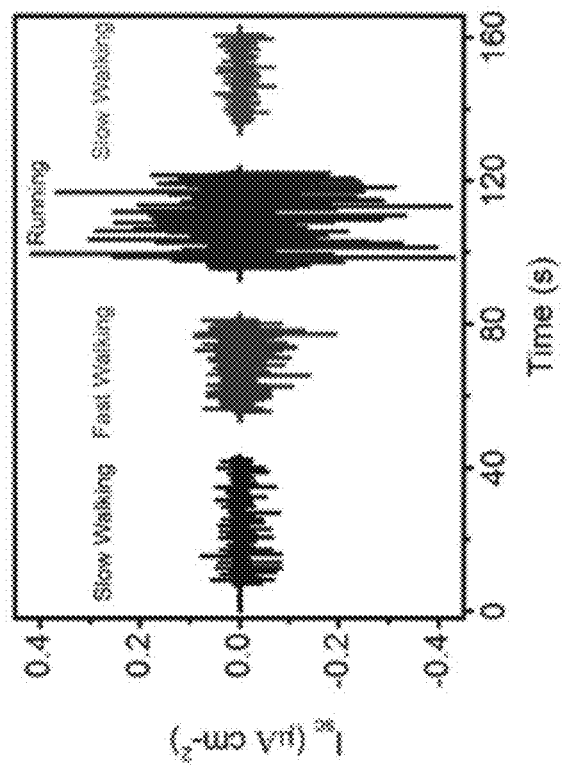
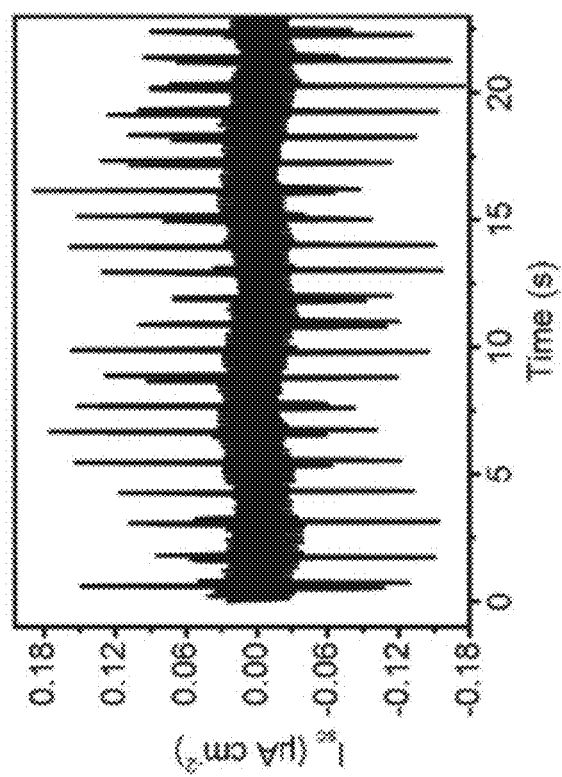
FIG. 17A
FIG. 17B

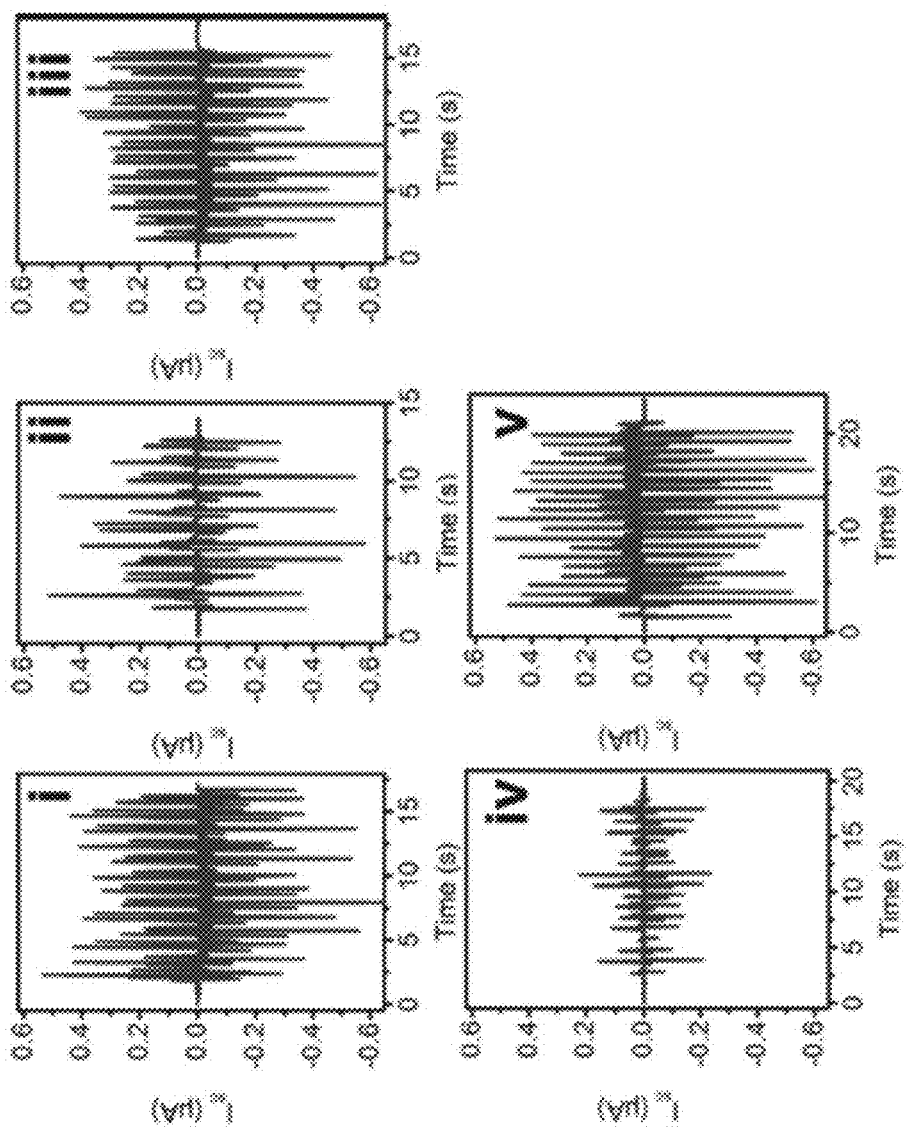
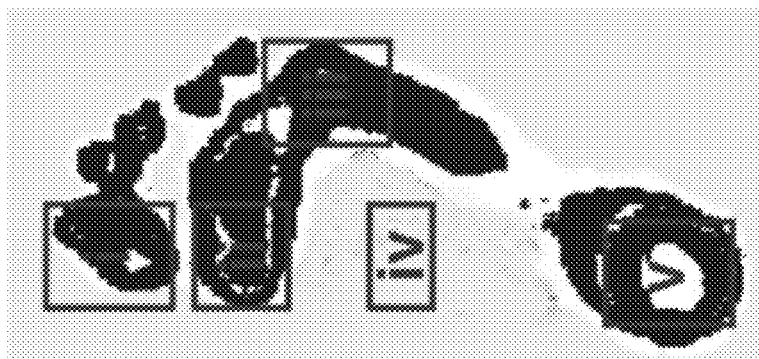
FIG. 18

ELECTRICAL APPARATUS AND A METHOD FOR FABRICATING AN ELECTRICAL APPARATUS

TECHNICAL FIELD

The present invention relates to an electrical apparatus and a method for fabricating an electrical apparatus, although not exclusively, to an electrical apparatus for use in wearable electronic devices with energy harvesting capabilities.

BACKGROUND

Electronic or electrical devices usually operate with suitable energy sources connected thereto. Common energy sources may include electrical sockets in a power grid, photovoltaic cells, fuel cells and batteries.

Portable electric devices, especially wearable devices are usually powered by portable energy sources such as batteries. The batteries are provided with a limited cycling stability and therefore the portable electric devices may be powered up by these batteries for a limited period of time. These batteries are designed to work in a charge-and-discharge cycle, which are particularly not convenient for wearable electronic devices which may operate continuously.

SUMMARY OF THE INVENTION

In accordance with a first aspect of the present invention, there is provided an electrical apparatus comprising an electrical signal generation structure arranged to generate an electrical signal in response to a change of an external pressure subjected thereto, wherein the electrical signal generation structure includes a fabric material.

In an embodiment of the first aspect, the electrical signal generation structure includes a pair of electrical signal generation layers arranged to generate an electrical signal in response to a relative movement between the pair of electrical signal generation layers.

In an embodiment of the first aspect, the pair of electrical signal generation layers are oppositely charged.

In an embodiment of the first aspect, the electrical signal is generated by electrostatic induction, preferably by triboelectrification.

In an embodiment of the first aspect, the pair of electrical signal generation layers are arranged to receive electrical charges when upon each layer of the pair of the electrical signal generation layers are in contact with each other.

In an embodiment of the first aspect, an electric potential difference is established between the pair of electrical signal generation layers when each layer of the pair of the electrical signal generation layers are separated from each other after the reception of electrical charges in each of the layers.

In an embodiment of the first aspect, the pair of electrical signal generation layers are charged by triboelectrification.

In an embodiment of the first aspect, the pair of electrical signal generation layers includes a first layer of material and a second layer of material; wherein the first and the second layers of material are arranged to exchange electrical charges when in contact with each other.

In an embodiment of the first aspect, the first and the second layers of materials include different electron affinities and/or tribo-polarity.

In an embodiment of the first aspect, the first layer of material includes a coating layer of polytetrafluoroethene.

In an embodiment of the first aspect, the fabric material includes nylon.

In an embodiment of the first aspect, the first layer of material is arranged to receive electrons from the second layer of material.

In an embodiment of the first aspect, the second layer of material includes a coating layer of graphene.

In an embodiment of the first aspect, the coating layer of graphene is arranged to collect the electrical charges generated in the second layer of material.

In an embodiment of the first aspect, the apparatus further comprises a spacer layer arranged to electrically separating the first and the second layers of material.

In an embodiment of the first aspect, the spacer layer includes a resilient structure.

In an embodiment of the first aspect, the spacer layer is arranged to be compressed when the electrical signal generation structure is subjected to the external pressure such that the first and the second layers of material are in contact with or proximate to each other.

In an embodiment of the first aspect, the first and the second layers of material are integrated to the spacer layer.

In an embodiment of the first aspect, the electrical signal generation structure includes a plurality of pixels on the pair of electrical signal generation layers.

In an embodiment of the first aspect, the electrical signal is arranged to power at least one electrical component connected thereto.

In an embodiment of the first aspect, the electrical signal is arranged to represent the change of the external pressure subjected by the electrical signal generation structure.

In an embodiment of the first aspect, the electrical signal generation structure is provided on a wearable item.

In an embodiment of the first aspect, the electrical signal is arranged to represent a motion of an object identified by the electrical signal generation structure.

In accordance with a second aspect of the present invention, there is provided a method for fabricating an electrical apparatus in accordance with the first aspect, comprising the steps of: providing a first electrical signal generation layer and a second electrical signal generation layer; and connecting the first and the second signal generation layer by defining the spacer layer between the first and the second signal generation layers.

In an embodiment of the second aspect, the spacer layer is defined by knitting of the fabric material between the first and the second signal generation layers.

In an embodiment of the second aspect, the step of providing a first electrical signal generation layer and a second electrical signal generation layer comprises the step of knitting the fabric material to define the first signal generation layer and the second signal generation layer.

In an embodiment of the first aspect, at least one of the first signal generation layer, the second signal generation layer and the spacer layer is produced by a flat knitting machine.

In an embodiment of the first aspect, the method further comprises the steps of: coating the first layer of material on the first signal generation layer; and/or coating the second layer of material on the second signal generation layer.

BRIEF DESCRIPTION OF THE DRAWINGS

Embodiments of the present invention will now be described, by way of example, with reference to the accompanying drawings in which:

FIGS. 2A and 2B are an illustration diagram and an SEM image of an electrical signal generation layer of the electrical apparatus of FIG. 1;

FIG. 5A is a top view photographic image of an electrical apparatus in accordance with an embodiment of the present invention;

FIGS. 5B and 5C are cross-section view photographic images of the electrical apparatus of FIG. 5A in an initial state and a compressed stated respectively;

FIG. 17A is a plot showing a record of $I_{sc}$ generated by the spacer fabric based TENG of FIG. 5A during human walking;

FIG. 17B is a plot showing a record of $I_{sc}$ generated by the spacer fabric based TENG of FIG. 5A during human motions with different modes;

FIG. 18 is an illustration of pressure distribution of human feet, and the $I_{sc}$ generated by the specified TENG pixels in the electrical apparatus of FIG. 5A located at different position of the foot.

DETAILED DESCRIPTION OF THE PREFERRED EMBODIMENT

The inventors have, through their own research, trials and experiments, devised that miniature electronic devices may be applied in our daily lives. Accordingly, there has been advancements in wearable electronic devices with multi-functionalities. The subsequently increasing demand of developments of wearable energy sources is the most critical challenge. However, the requirement of frequently charging during long-term use of conventional energy storage devices is a drawback.

Preferably, nanogenerators may be used to harvest the mechanical energy, especially from human motions (e.g. walking and stretching), which may further the mechanical energy to electrical energy for powering up electrical devices.

Figure 1:
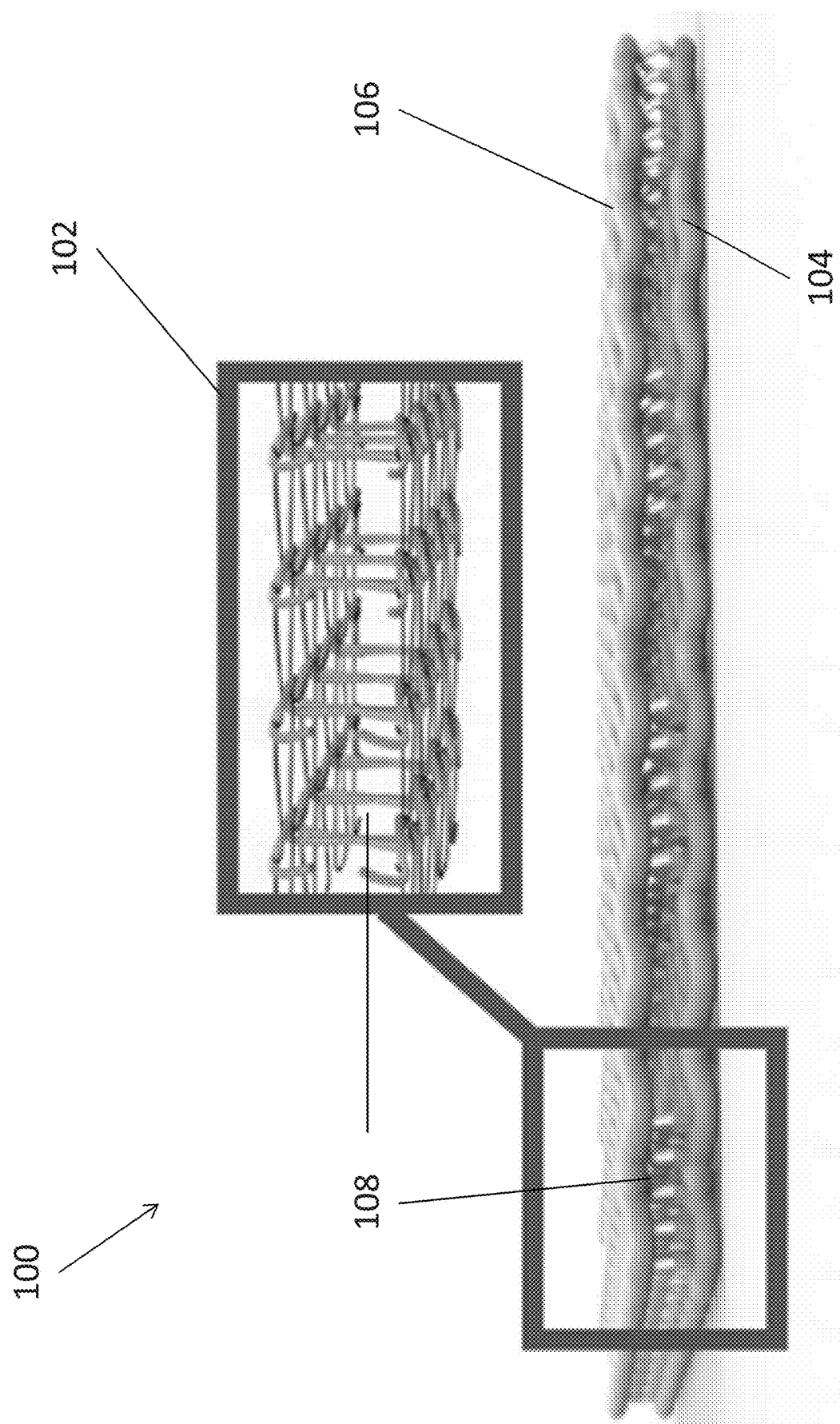
FIG. 1 is a perspective view of an electrical apparatus in accordance with one embodiment of the present invention.

With reference to FIG. 1, there is shown an embodiment of an electrical apparatus 100 comprising an electrical signal generation structure 102 arranged to generate an electrical signal in response to a change of an external pressure subjected thereto, wherein the electrical signal generation structure 102 includes a fabric material.

In this embodiment, the electrical signal generation structure 102 includes a pair of electrical signal generation layers, including a first electrical signal generation layer 104 and a second electrical signal generation layer 106. When an external pressure is applied from the opposite sides of the two layers, the electrical signal generation layers (104, 106) moves relative to each other and the distance between the layers is decreased. Alternatively, when an external force is applied to pull apart the two layers, the distance between the layers is increased.

For example, the two electrical signal generation layers (104, 106) are oppositely charged, such that an electrical signal may be generated in response to a relative movement between the pair of electrical signal generation layers (104, 106) (i.e. an increase or a decrease of the distance between the layers), such as by electrostatic induction, and preferably by triboelectrification.

Preferably, the electrical signal generation structure 102 may define a triboelectric nanogenerator arranged to generate electrical signal or energy for powering one or more electrical components/devices connected thereto. Triboelectric nanogenerators (TENGs) are based on the conjunction of triboelectrification and electrostatic induction. TENGs may harvest mechanical energy from human motions and convert it into electricity at a high efficiency and output power density. Furthermore, TENGs can be easily incorporated into fabrics because the triboelectrification ubiquitously exists for common materials used for fabrics, such as nylon, polyester and Teflon (PTFE). Therefore, the electrical signal generation structure 102 may be provided on a wearable item or device.

Without wishing to be bound by theory, there are three modes of TENGs: sliding mode, rotation mode, and vertical contact mode. Compared to the former two, the vertical contact mode based TENGs are more preferable in wearable TENGs since the vertical movements account for the main part of human activities. Vertical contact mode based TENGs may be fabricated by designing the arch structures or stacking structures with elastic additives. However, intrinsically wearable devices require an implementation with proper resilience imparted into the fabric materials. Therefore, the delicately designed fabrics with excellent resilience are considered crucial for inherently wearable TENGs.

With reference to FIGS. 2A to 2B, there is provided an example embodiment of an electrical signal generation layer (104 or 106) made of a fabric material, such as but not limited to nylon or other common fabric including polyester, rayon, and cotton, etc. In some examples, the electrical signal generation layer may include more than one fabric materials depending of requirements of the desired mechanical/electrical properties of the electrical signal generation layer. Referring to the SEM image as shown in FIG. 2B, a plurality of fabric strands combine (such as by knitting or sewing) to define substantially a continuous layer of fabric material, which may be included in the electrical signal generation structure 102.

Preferably, the electrical signal generation layer (104, 106) may be produced by using a flat knitting machine or any suitable fabric processing apparatus/method.

As discussed above, the electrical signal generation structure 102 includes a pair of electrical signal generation layers (104, 106), therefore at least one addition layer as illustration in FIG. 2A may be included. Functionalized layer of material (coatings 104C, 106C) may be included as a portion or the entire electrical signal generation layer, thus defining a first and a second electrical signal generation layers (or namely a lower/down layer 104 and a upper layer 106 as described below). The upper and/or down layer may be fabricated from sewing the nylon fibers, which provides a relatively rough surface that is a benefit for TENGs.

To collect the charges generated on the nylon surface from the triboelectrification and the electrostatic induction, the fabric materials in each of the layer include different electrical properties. Preferably, the fabric in each layer may be coated with different coating layer (104C, 106C). Hence, the first and the second layers of materials include different electron affinities and/or tribo-polarity, and the pair of electrical signal generation layers may be charged by triboelectrification.

Figure 3A:
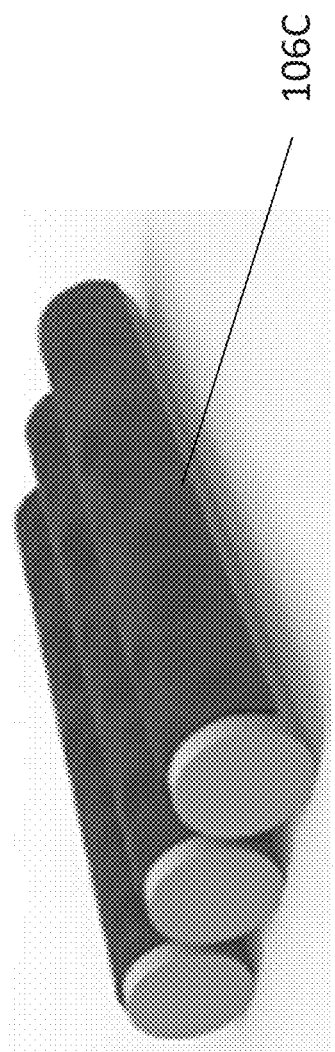
FIGS. 3A and 3B are an illustration diagram and an SEM image of a fabric material of the electrical signal generation layer of FIG. 2A.
Figure 3B:
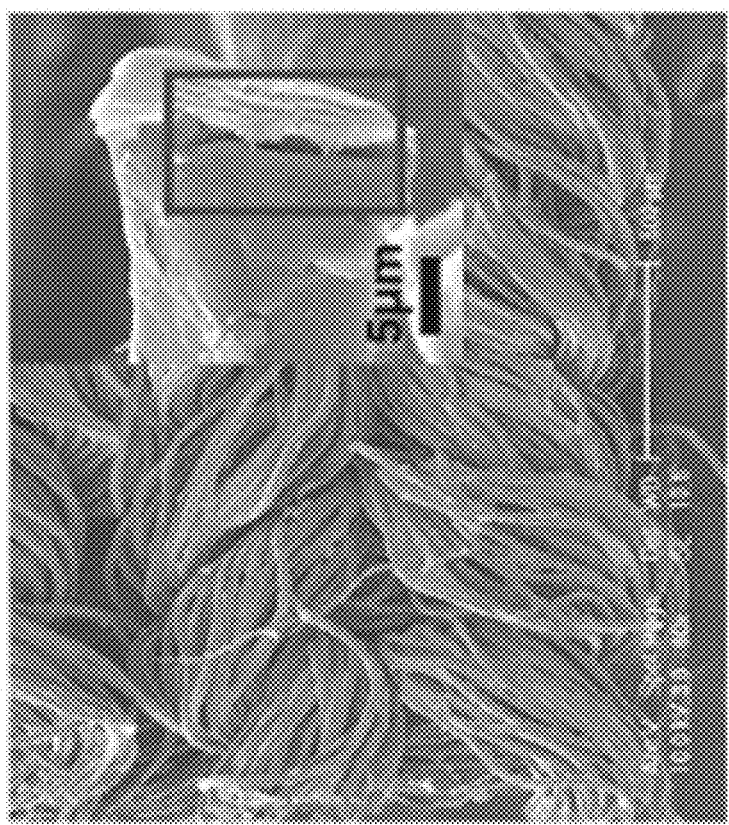

With reference to FIGS. 3A and 3B, the second layer of material or the upper layer 106 include a layer of graphene (ink) 106C coated on each of the nylon fibers. The SEM image shown in FIG. 3B illustrates that graphene may be coated on the upper surface of the upper layer 106, therefore imparting the pathways for collection of electrical charges generated in the second layer of material 106C. The insets in FIG. 3B further shows that the graphene layer 106C tightly attach to the upper surface of nylon fibers, therefore providing the good conductivity (Detailed comparison between the performances of coated and uncoated upper layer 106 is discussed in a later part of the disclosure).

Figure 4A:
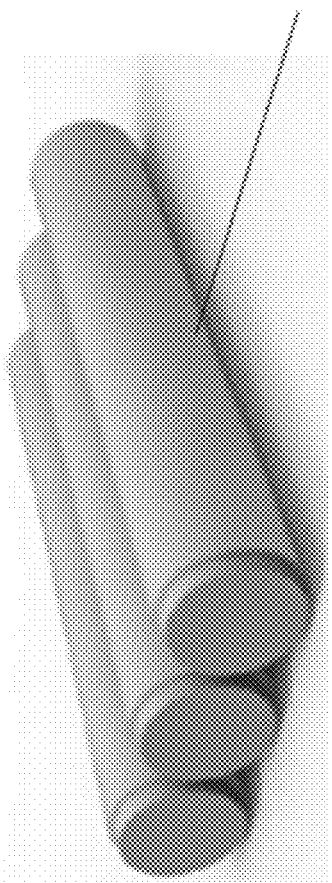
FIGS. 4A and 4B are an illustration diagram and an SEM image of another fabric material of the electrical signal generation layer of FIG. 2A.
Figure 4B:
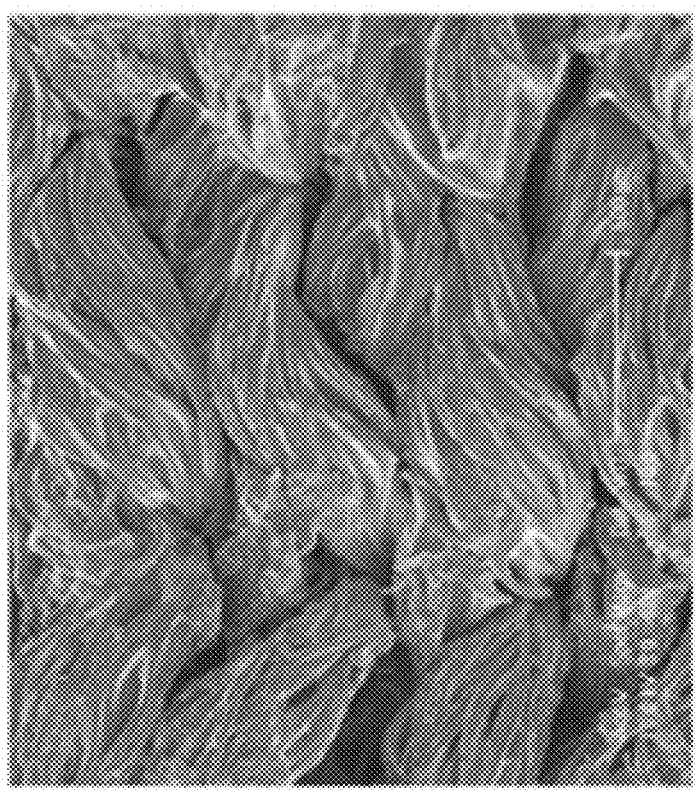

As the upper layer 106 is based on nylon, which has a positive tribo-polarity, the down layer 104 is arranged to function with a negative tribo-polarity due to the working principle of TENGs. Preferably, referring to FIGS. 4A and 4B, the first layer of material 104C includes a coating layer of polytetrafluoroethene (PTFE). The PTFE textile coating 104C that has excellent nylon compatibility and highly negative tribo-polarity is used to coat the down layer 104. Preferably, the nylon fibers may be wrapped by PTFE textile coatings 104C. The PTFE textile coating 104C stickily wraps around the nylon fibers as seen from the SEM image in FIG. 4B, and the coating 104C offers excellent opposite tribo-polarity compared to the upper nylon layer.

Alternatively, the first and/or the second layer of materials may include other possible coatings or fabric material as appreciated by a person skilled in the art.

With reference to FIGS. 1 and 5A to 5C, the electrical apparatus 100 further comprises a spacer layer 108 deposited between the first and the second layers of material (104C, 106C) or the pair of electrical signal generation layers (104, 106) of the electrical signal generation structure 102.

Referring to FIG. 5C, the spacer layer 108 may be compressed when the electrical signal generation structure 102 is subjected to an external pressure, for example when certain amount of weight is placed on the electrical apparatus 100, the gap between the two layers (104, 106) and thus the first and the second layers of material (104C, 106C) is reduced, therefore, the two layers of material are proximate to each other or even in contact with each other.

Preferably, the spacer layer 108 may include a resilient structure arranged to retain a predefined distance between the first and the second layers of material (104C, 106C). Hence, when the applied external pressure is released from the electrical apparatus 100, the distance between the first and the second layers of material (104C, 106C) is restored by the resilient structure, as shown in FIG. 5B. This strong bounciness enhances a performance of the TENG 100 based on this spacer fabric.

Alternatively, to impart the resilience to fabrics, spring or other elastic additives may be added between two separate layers. However, although this strategy may be effective, the reliability of the fabricated fabrics is a potential liability, letting alone the great decrease in the wearing comfort. Therefore, it is imperative to design and fabricate a fabric with intrinsic resilience that can be used for the vertical contact mode based TENG.

Optionally, the abovementioned electrical signal generation layers (104, 106) and/or the first and second layers of material (104C, 106C) may be integrated to the spacer layer 108. For example, coating materials (104C, 106C) may be deposited on opposite sides of the two fabric layers of the spacer layer 108 to define the two electrical signal generation layers (104, 106) of the electrical signal generation structure 102.

As appreciated by a skilled person, the electrical apparatus 100 may include additional number of electrical signal generation structures 102, and it is also possible that each of the electrical signal generation structures 102 may include more than two electrical signal generation layers (104, 106) or more than a pair of electrical signal generation layers.

With reference also to FIG. 1, the spacer fabric layer 108 is preferably based on a 3D weft-knitted structure. The spacer layer 108 may define three functional layers: two outer fabric layers and a spacer yarn layer. The spacer yarn layer (inset in FIG. 1) may offer a good resilience for the whole fabric. In addition, to make the spacer fabric easy for fabrication of the TENG 100, the materials used for sewing the upper and down layers (104, 106) should be delicately selected, such that the electrical properties of these layers meet the requirement of the TENG.

It may be also preferable that the electrical signal generation structure 102 includes a plurality of pixels on the pair of electrical signal generation layers. With reference to FIG. 5A, there is shown a top view photographic image of an embodiment of a spacer fabric based TENG 100. Preferably, the coatings (104C, 106C) are pixelated so that one spacer fabric 108 may include multiple individual TENGs, which may be further optimized to a multifunctional device. The performances of the pixelated electrical signal generation structure 102 will be discussed later in this disclosure.

Taking the tribo-polarity, suitability for sewing and wearing comfort into account, nylon, a common material used in clothes with very high tendency to lose electrons, may be used as the material for upper and down layers (104, 106).

Figure 6:
FIG. 6 is a photographic image of a computerized knitting flat knitting machine for use in manufacturing the electrical apparatus of FIG. 5A.
Figure 7:
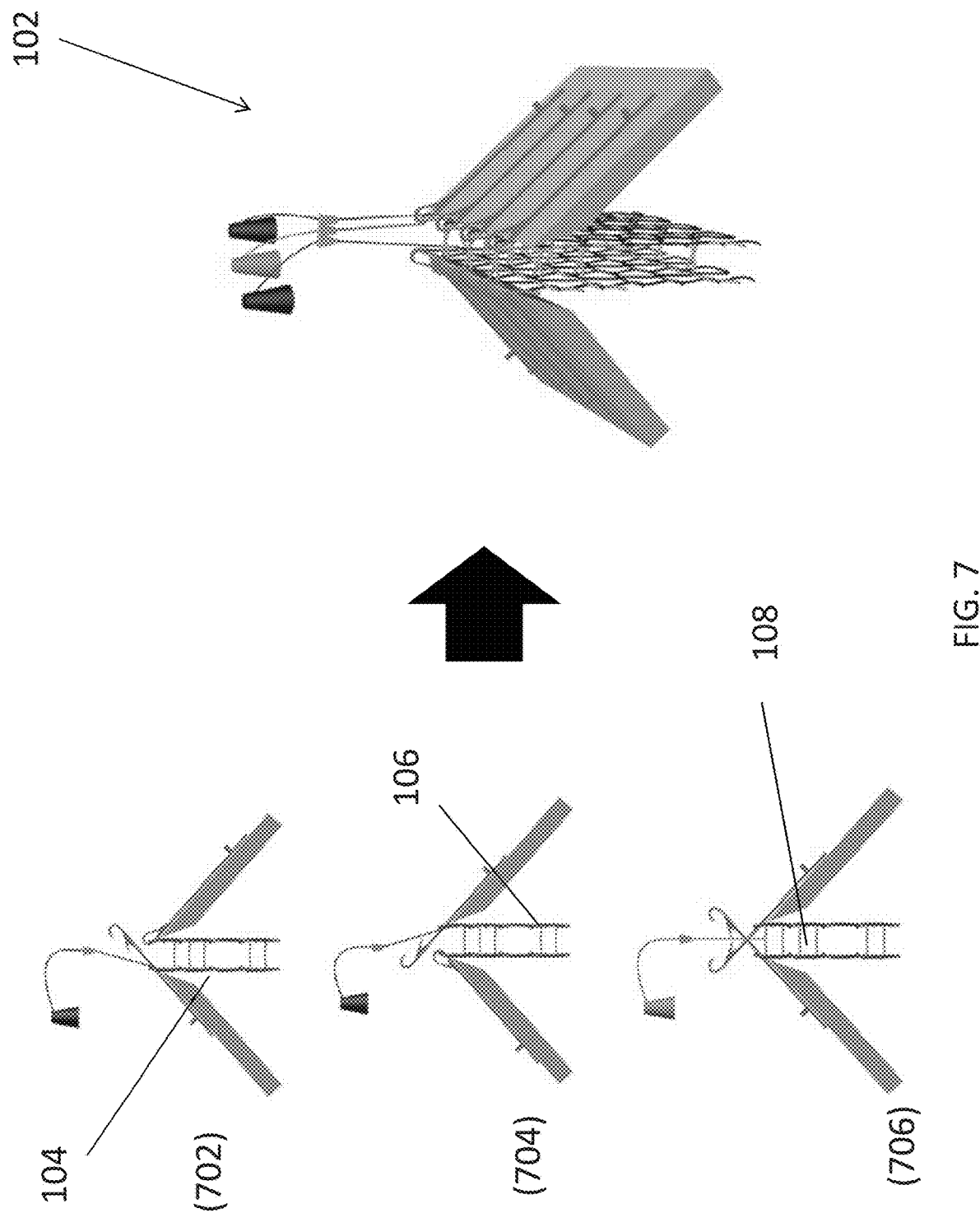
FIG. 7 is a process flow diagram of a method for fabricating the electrical apparatus of FIG. 1.

With reference to FIGS. 6 and 7, there is shown an embodiment of a method for fabricating the electrical apparatus 100. The method comprises the steps of: providing a first electrical signal generation layer 104 and a second electrical signal generation layer 106; and connecting the first and the second signal generation layer by defining the spacer layer 108 between the first and the second signal generation layers.

In this embodiment, the first and/or the second signal generation layer (104, 106) are defined by knitting a fabric material, and the spacer layer 108 may be defined by knitting of the fabric material between the first and the second electrical signal generation layers (104, 106).

Preferably, the spacer fabric (including the electrical signal generation layer(s) (104, 106) and/or the spacer layer 108) may be produced by a (computerized) flat knitting machine as shown in FIG. 6. In such type of machine, the front needle bed and back needle bed are positioned horizontally while the carriage which contains the cam systems moves back and forth across the needle bed to make the fabric. Alternatively these layers may be produced using other knitting or sewing machines.

In one example embodiment, referring to FIG. 7, three sets of yarns are required to knit the spacer fabric. In particular, the first step is to knit the first layer of the fabric 104 on the front needle bed using the first set of yarn (step 702). The second step is to knit the second layer of the fabric 106 on the back needle bed using the second set of yarn (step 704). And the third step is to knit the spacer layer 108 on both the front needle bed and back needle bed using the third set of yarn in order to connect the first layer 104 and second layer 106 together. In order to fabricate spacer fabric with hollow spaces, the spacer layer 108 is alternately knitted with an undefined sequence (step 706).

Preferably, in order to keep the space between two outer fabric layers, monofilament must be used to knit the spacer layer 108 due to its high stiffness, and multifilament is normally used to knit two outer fabric layers to get a soft handle.

Optionally, an additional step in which the first and/or the second layer of material (104C, 106C) may be coated on the first and/or the second signal generation layer (104, 106) respectively. The coating step may be carried out before or after the interconnecting spacer layer 108 is defined. Alternatively, the first and/or the second layer of material may be pre-coated on the fabric material before the knitting steps.

Figure 8:
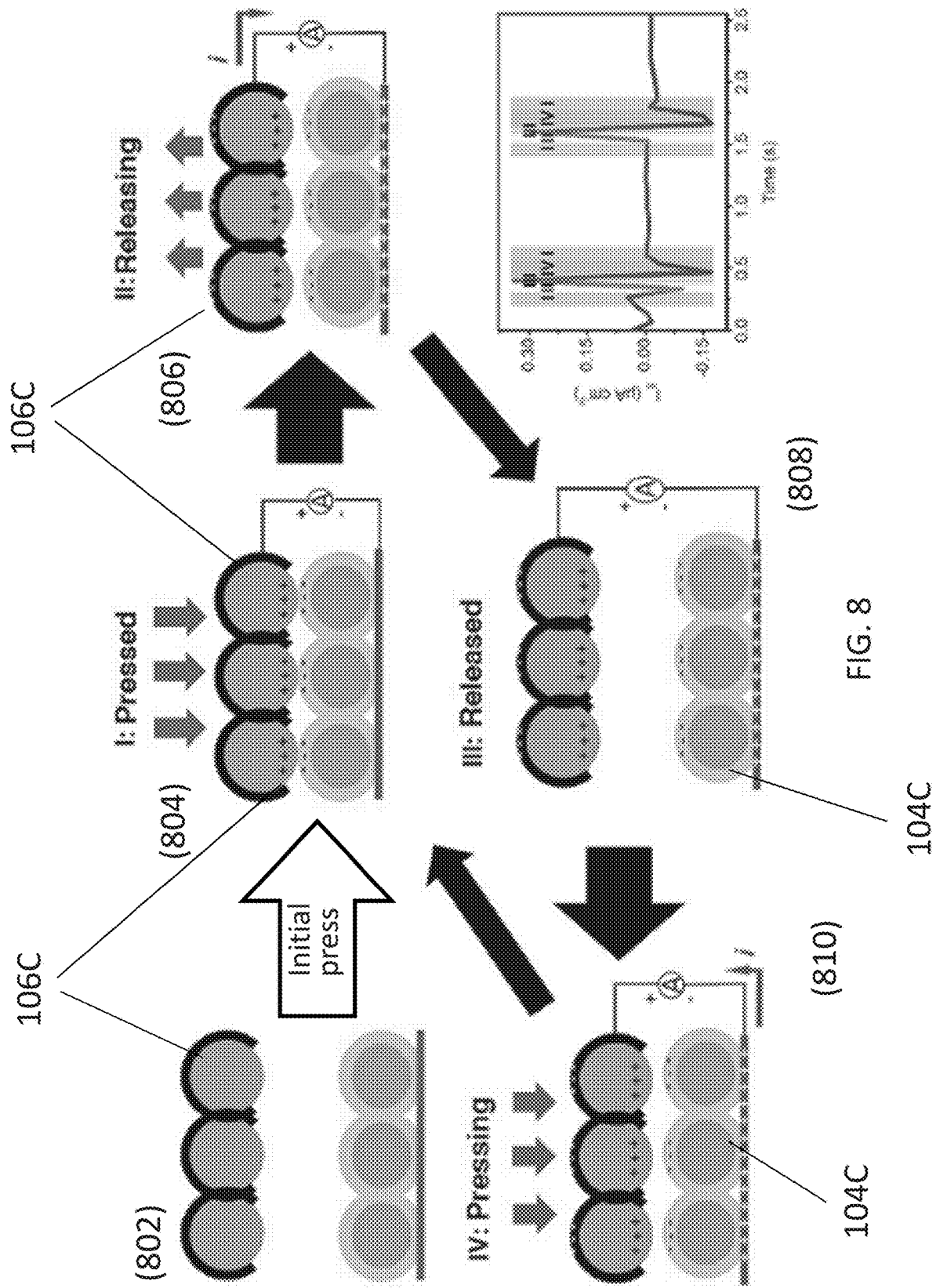
FIG. 8 is an illustration of the operation and the corresponding current-voltage profile of the electrical apparatus of FIG. 1.

With reference to FIG. 8, there is shown an example operation of the electrical apparatus 100. The operation is preferably based on two main processes which include charging the electrical signal generation layers and generation of electrical signal by electrostatic induction of the charged electrical signal generation layers.

Preferably, the pair of electrical signal generation layers are arranged to receive electrical charges when upon each layer of the pair of the electrical signal generation layers are in contact with each other. For example, the first and the second layers of material (104C, 106C) may exchange electrical charges when in contact with each other, i.e. the first layer of material 104 may receive electrons from the second layer of material 106, or vice versa. The spacer layer 108 is arranged to electrical separating the first and the second layer of material in a normal state without being subjected to an external pressure.

The electrical signal may represent a motion of an object identified by the electrical signal generation structure. For example, a generation of multiple signals within a predetermined period may represent walking-steps of a human within that period if the apparatus is installed in his shoes.

The operation starts at step 802, where no charge is generated at the initial stage. When the upper and down layers (104, 106) of spacer fabrics are brought to contact by an external force/pressure, the surface charge will transfer due to the triboelectrification. According to the triboelectric series/electron affinities of the materials, the nylon layer 106 tends to lose electrons while the PTFE coated nylon layer 104 favors receiving electrons. Thus, electrons are injected from the nylon layer 106 to PTFE coated nylon layer 104 in step 804. As a result, the positive charges accumulate at the surface of nylon layer 106 and negative charges congregate at the surface of the PTFE coated nylon layer 104. Since these charges locate on the almost same layer when the two layers (104, 106) are substantially in contact (or electrically connected), no electric potential difference (EPD) between different layers is established.

In step 806, when the external force is released, the upper and down layer start to separate due to the inherent resilience of the spacer fabric. Once these two layers separate, the EPD will be generated, therefore EPD is established between the pair of electrical signal generation layers when each layer of the pair of the electrical signal generation layers are separated from each other after the reception of electrical charges in each of the layers.

In step 808, the EPD will increase with the increasing distance between the two layers and reach the maximum value when the spacer fabric returns to its initial state. Preferably the EPD generated can be defined as the following equation:

$$U_T - U_B = -\frac{\sigma d}{\varepsilon}$$

where σ represents the triboelectric charge density, ε is the vacuum permittivity, and d is the distance between two layers.

In step 810, when the external force is applied again, the EPD will start to diminish as the two layers get closer to each other and the process repeats from step 804 again. Since the EPD is established, the electrons can be driven to flow between the two layers if the two electrodes are shorted. The electrons will be propelled from the PTFE coated nylon electrode to the nylon electrode during the releasing process due to the higher potential of the nylon electrode. This will result in the positive current during the releasing process, which can be clearly found in the record of short circuit current ($I_{sc}$) versus time shown in the I-V curve in FIG. 8.

When the electrical apparatus 100 is pressed again, the electrons will be driven from the nylon electrode to the PTFE coated nylon electrode to reduce the amount of charges of PTFE coated nylon electrode because decreasing interlayer distance will induce a higher potential of PTFE coated electrode in step 810. As the result, the negative current is instantaneously generated.

Such generation of electrical signal may be arranged to power up an electronic/electrical device connected thereto, or may be arranged to represent the change of the eternal pressure subjected by the electrical signal generation structure 102. Hence the electrical apparatus 100 may be implemented as an electrical power generator and/or an electrical pressure sensor.

Figure 9:
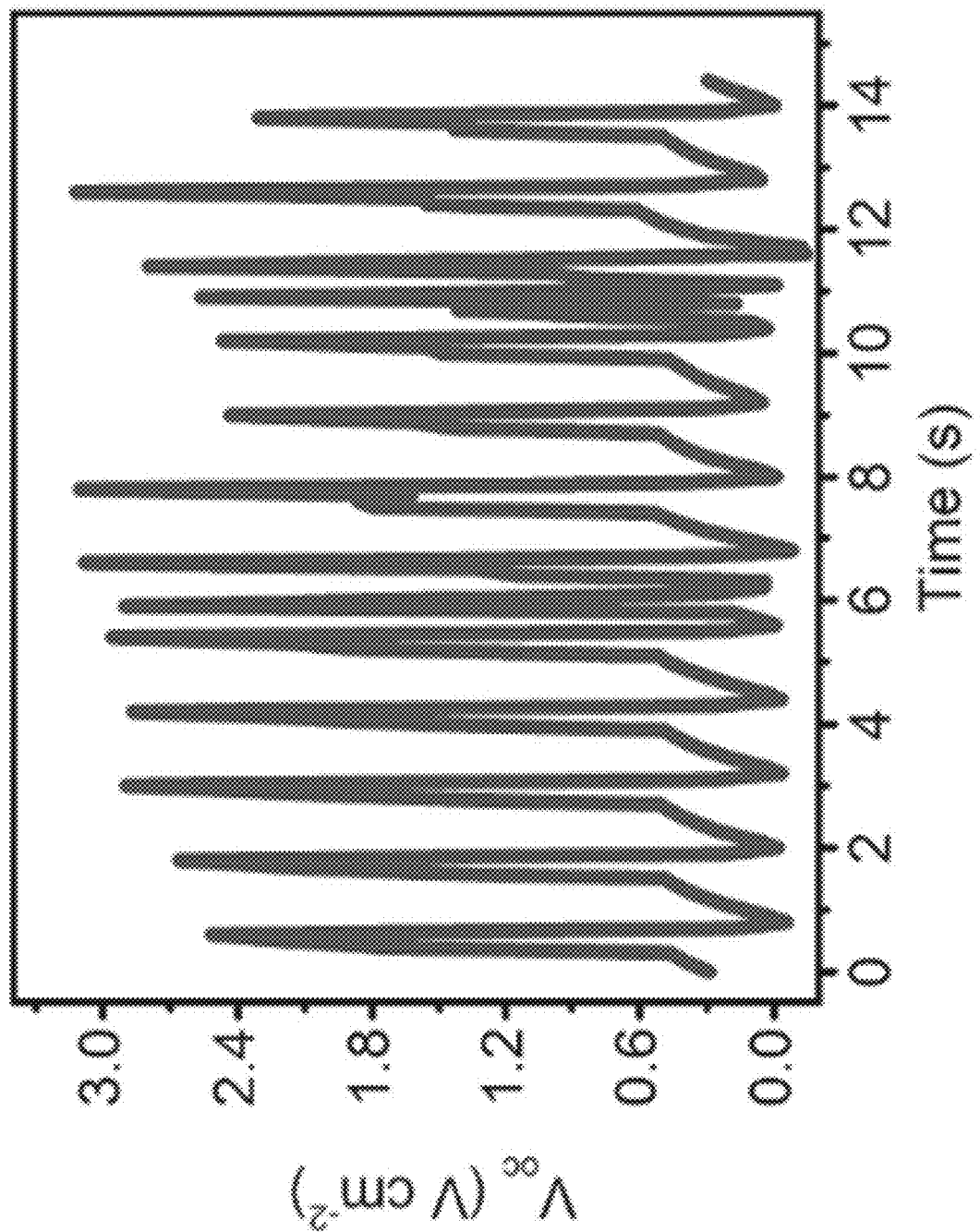
FIG. 9 is a plot showing $V_{oc}$ of the spacer fabric based TENG of FIG. 5A measured with the deformation frequency of 1 Hz.

The inventors have carried out experiments to investigate the performance of electrical apparatus 100 or the spacer fabric based TENG implemented in accordance with an embodiment of the present invention. With reference to FIG. 9, there is shown the profiles of open circuit voltage ($V_{oc}$) generated under the frequency of 1 Hz. It is obvious that the value of $V_{oc}$ can reach 3.3 V $cm^{-2}$, showing the decent performance of accumulating charges when the nylon layer and PTFE coated nylon layer are brought into contact.

Figure 10:
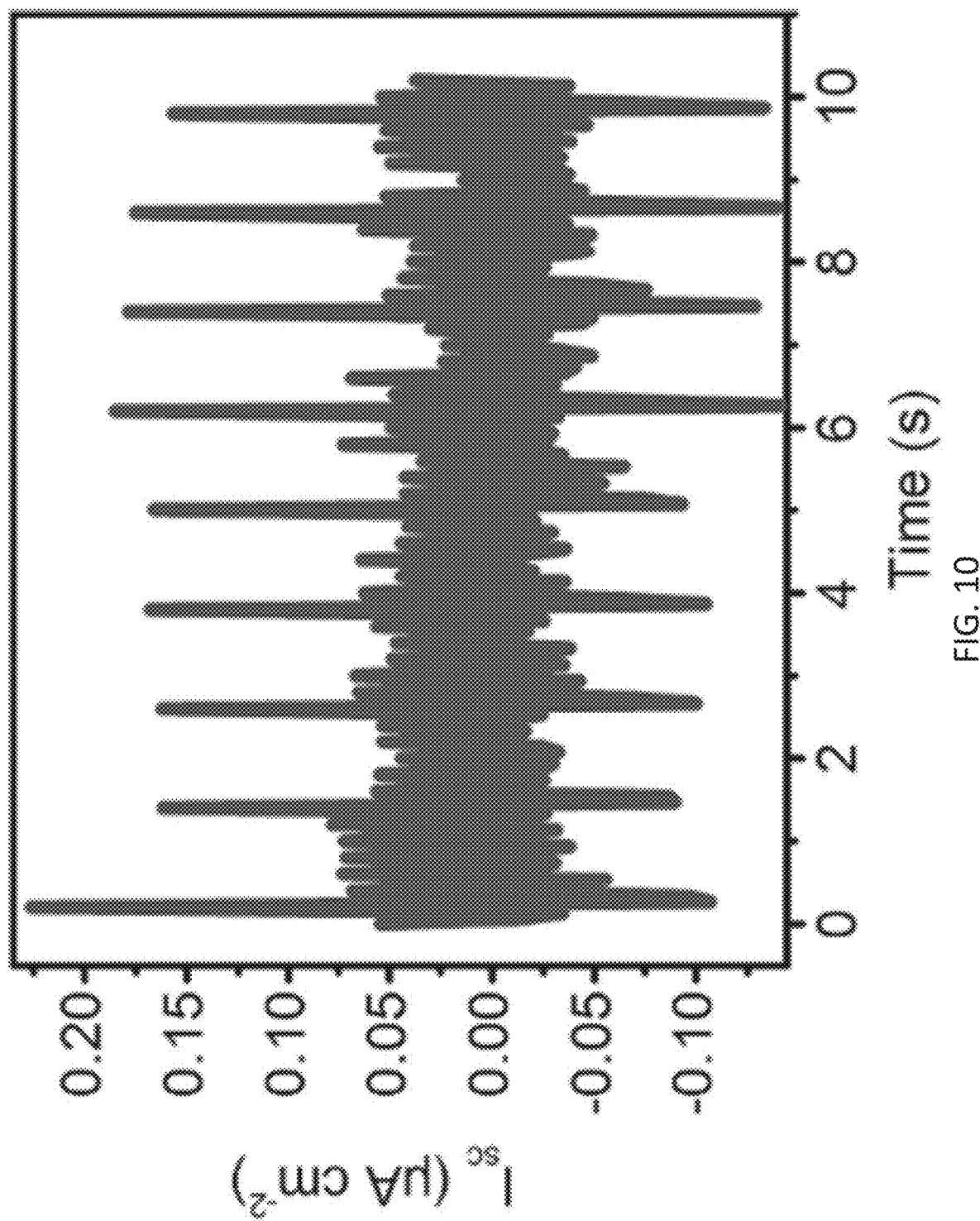
FIG. 10 is a plot showing $I_{sc}$ of the spacer fabric based TENG of FIG. 5A measured with the deformation frequency of 1 Hz.

With reference to FIG. 10, it is shown that the peak value of short circuit current ($I_{sc}$) reaches 0.2 µA $cm^{-2}$ under releasing state, while the peak value of $I_{sc}$ can only reach 0.1 µA $cm^{-2}$ during the pressing period. This corresponds to that the half cycle releasing is at higher rate than pressing. Since the mechanical energy from the environment, especially from the human motions, varies in frequencies, it may be necessary to investigate the output performance of the spacer fabric based TENG under different deformation frequencies. Therefore, the performance of the spacer fabric based TENG is tested under the same amplitude of the triggering motor but different deformation frequencies, ranging from 0.5 Hz to 3 Hz, which are common frequencies of human motions, especially for human walking or running.

Figure 11:
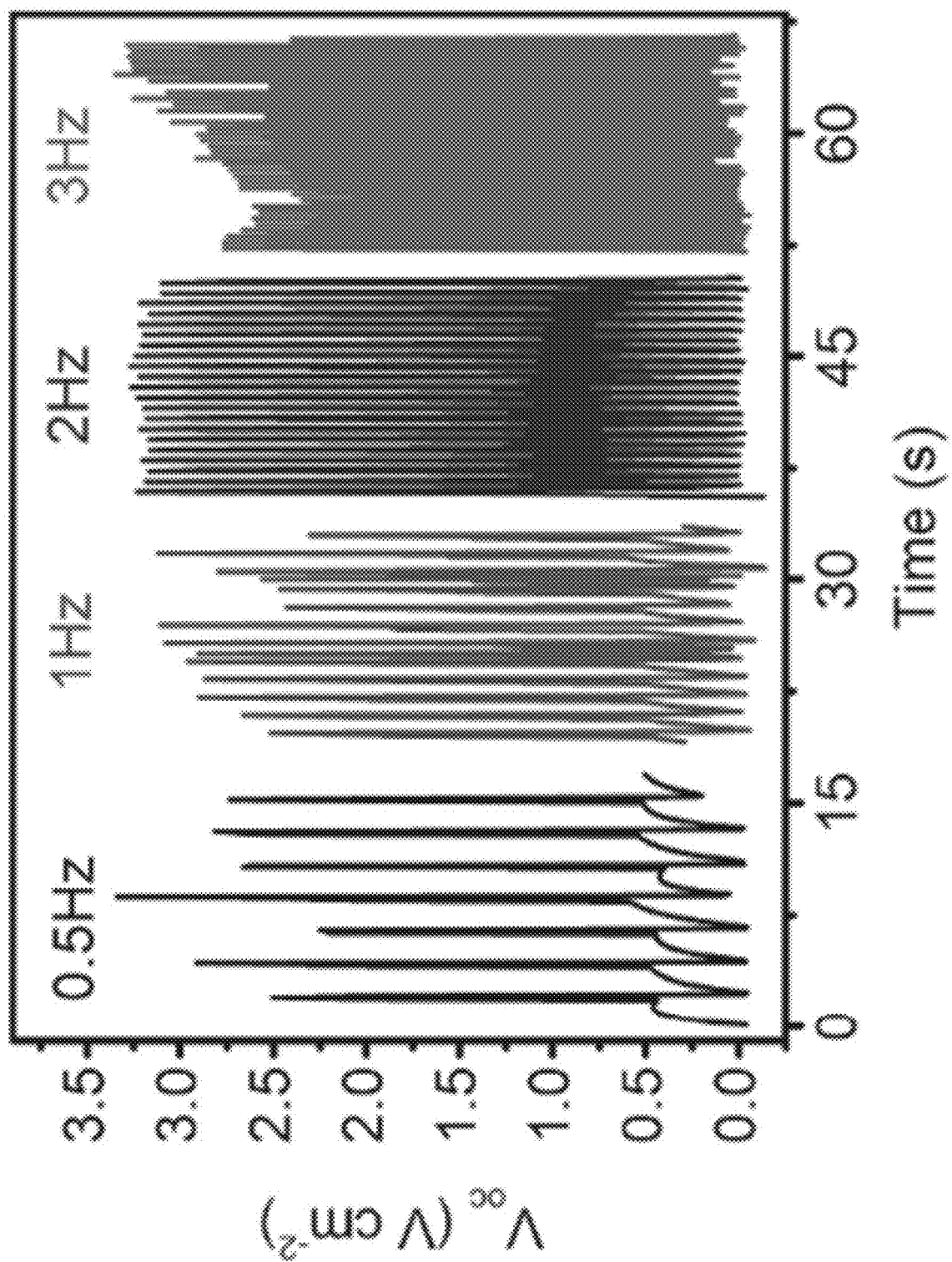
FIG. 11 is a plot showing $V_{oc}$ of the spacer fabric based TENG of FIG. 5A measured at different deformation frequencies.
Figure 12:
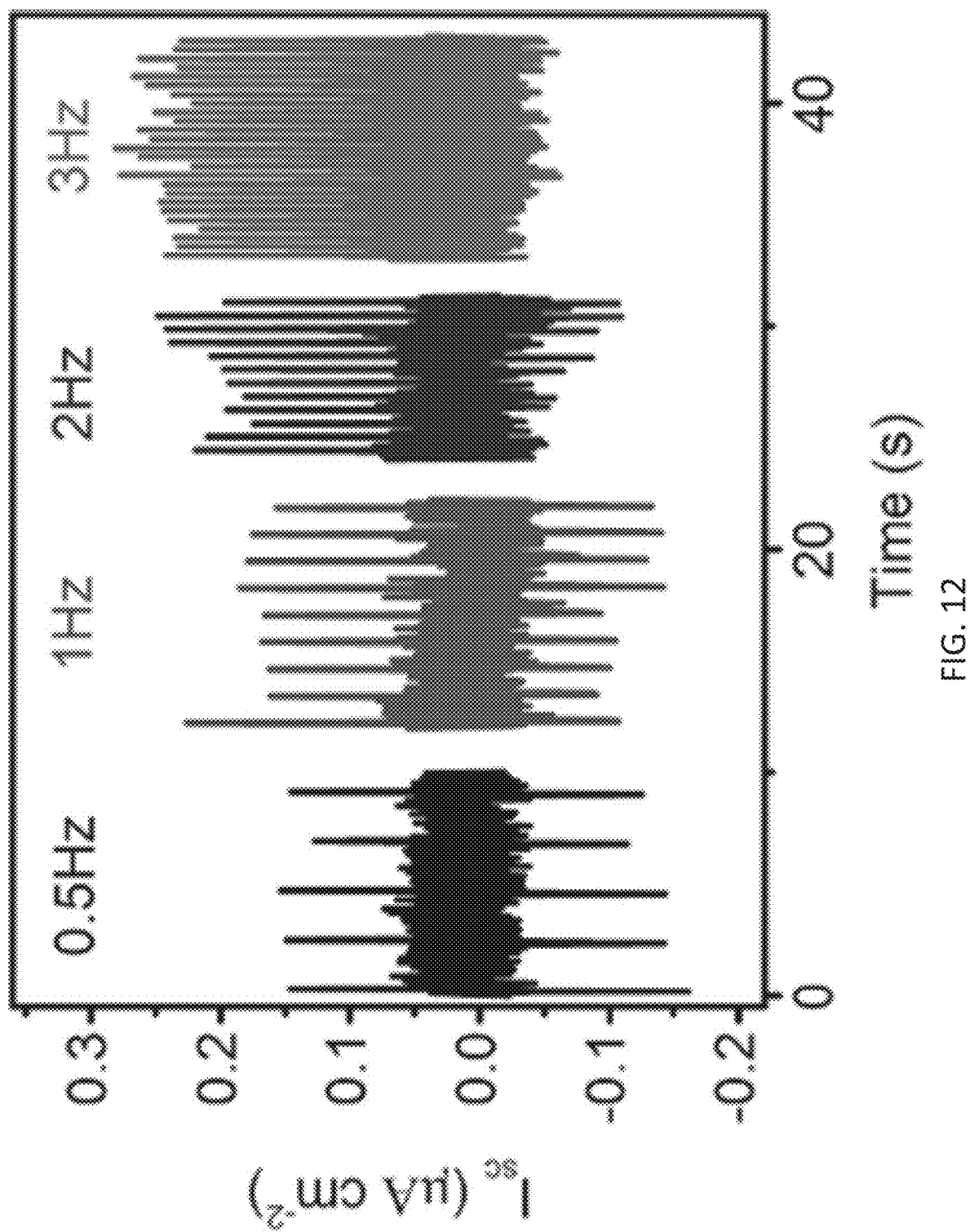
FIG. 12 is a plot showing $I_{sc}$ of the spacer fabric based TENG of FIG. 5A measured at different deformation frequencies.

With reference to FIG. 11, $V_{oc}$ almost remains constant at different frequencies. This is attributed to that no dynamic process of charge transfer is involved under the open circuit state, thus the open circuit voltage only depends on the triboelectric charge density and the separation distance. On the other hand, referring to FIG. 12, the $I_{sc}$ increases with the increasing frequencies. It is clear that the $I_{sc}$ increases from 0.2 µA $cm^{-2}$ at the frequency of 0.5 Hz to 0.3 µA $cm^{-2}$ at the frequency of 3 Hz. The dependence of $I_{sc}$ on the frequency can be explained as that the higher flow rate of charge, that is the higher current, can be achieved as the time for charge flowing is shorter resulted from deformation rate increases with the increasing frequency.

Preferably, for human motions, the different frequencies usually represent the different types of motions. Therefore, the dependence of the $I_{sc}$ of the spacer fabric based TENG on frequencies may be used for identifying and monitoring the different human motions.

Figure 13:
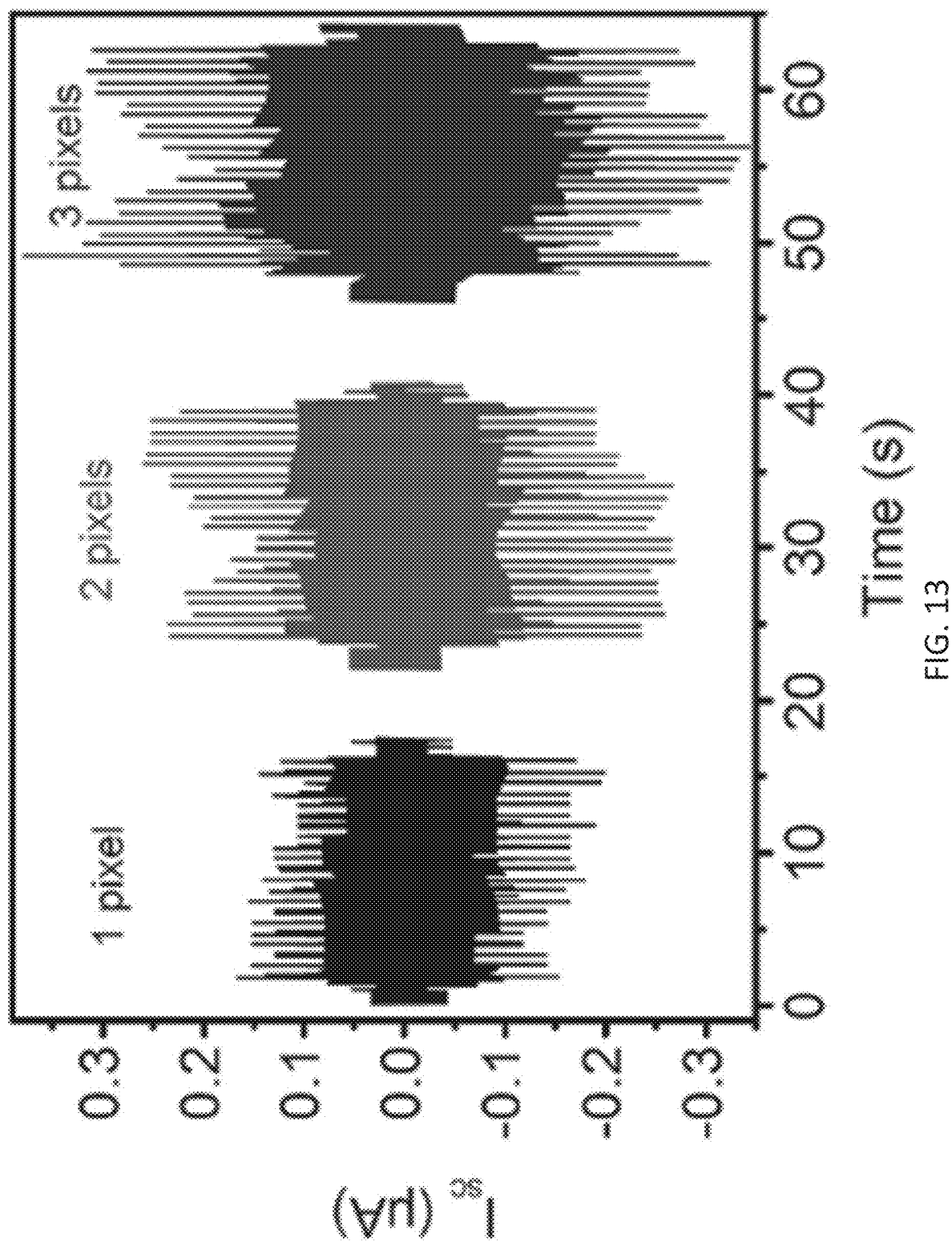
FIG. 13 is a plot showing $I_{sc}$ generated by different numbers of TENG pixels in the electrical apparatus of FIG. 5A.

In addition, as the spacer fabric may be pixelated for fabrication of TENGs, with reference to FIG. 13, there is shown the performance of TENG arrays with different number of TENG pixels. It is obvious that the $I_{sc}$ increases with the increasing numbers of TENG pixels due to the larger surface for contact.

Figure 14:
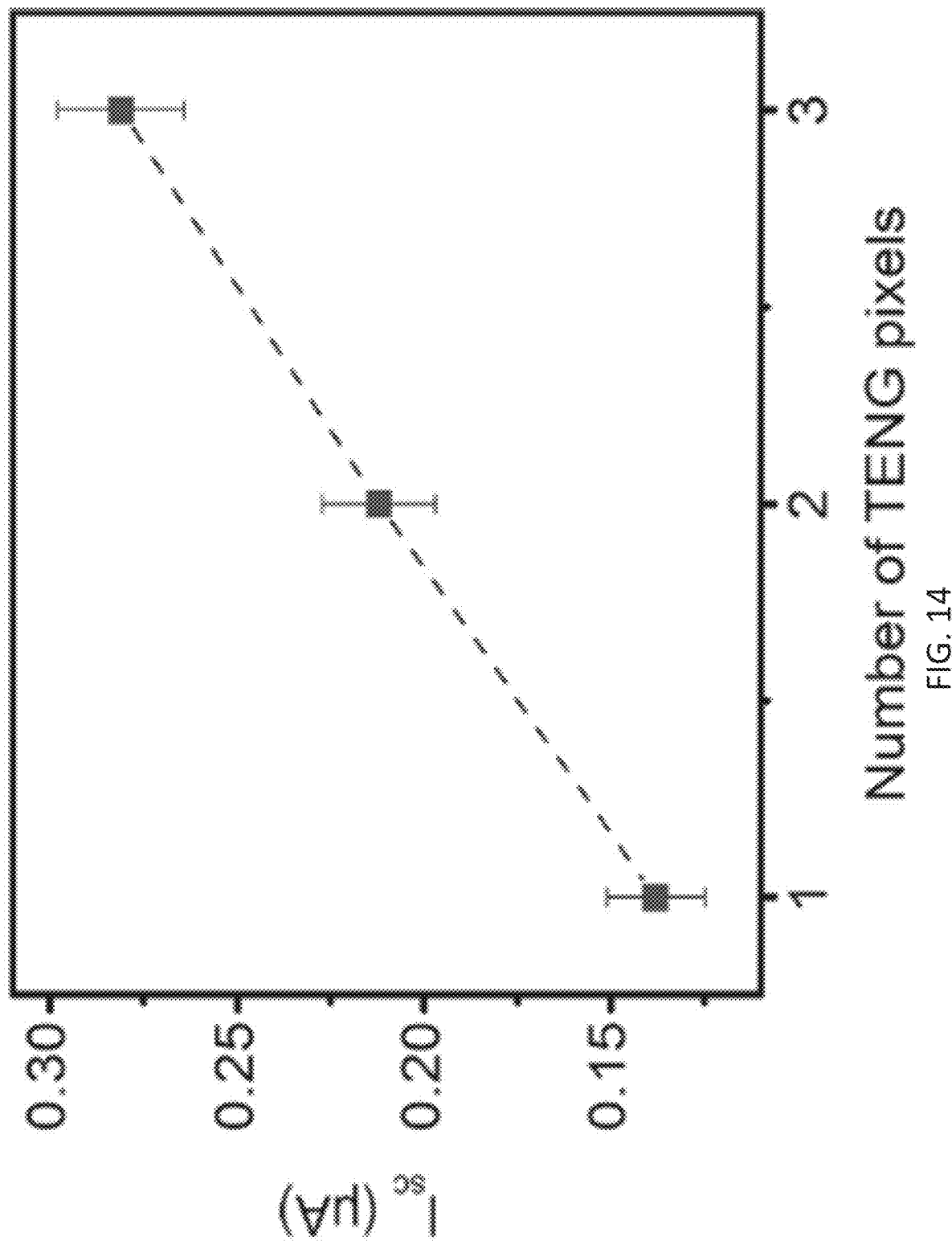
FIG. 14 is a plot showing the peak $I_{sc}$ values achieved by different numbers of TENG pixels in the electrical apparatus of FIG. 5A.

With reference to FIG. 14, there is shown the value of $I_{sc}$ achieved with the different number of TENG pixels. The $I_{sc}$ increases from 0.13 µA $cm^{-2}$ to 0.28 µA $cm^{-2}$ with the number of TENG pixels increasing from 1 to 3. Moreover, the increasing trend almost shows a linear relationship, indicating that the output of the spacer fabric based TENG can be delicately tuned by controlling the number of TENG pixels.

Figure 15A:
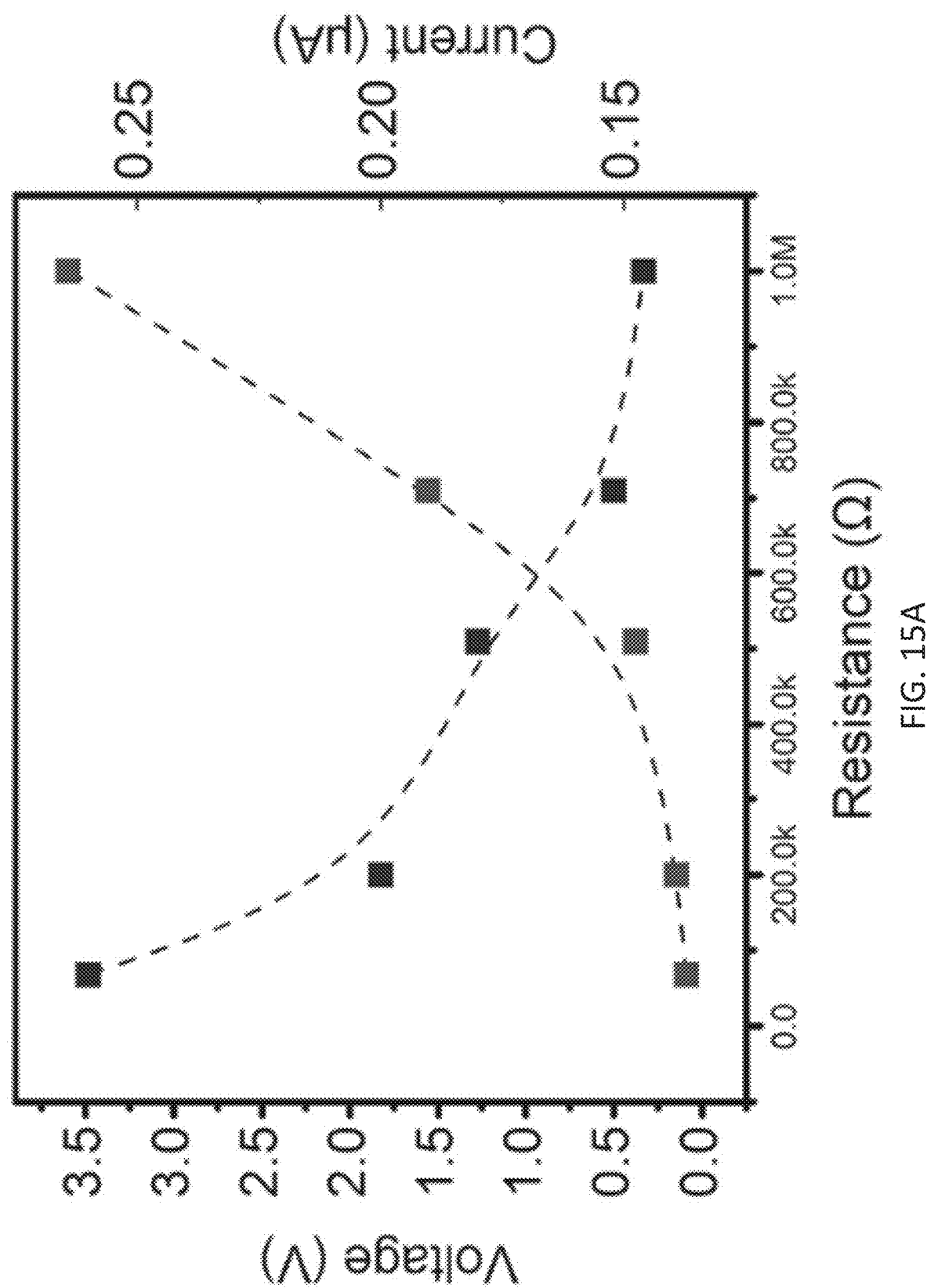
FIG. 15A is a plot showing the output voltage and current of the spacer fabric based TENG of FIG. 5A on the load resistance.
Figure 15B:
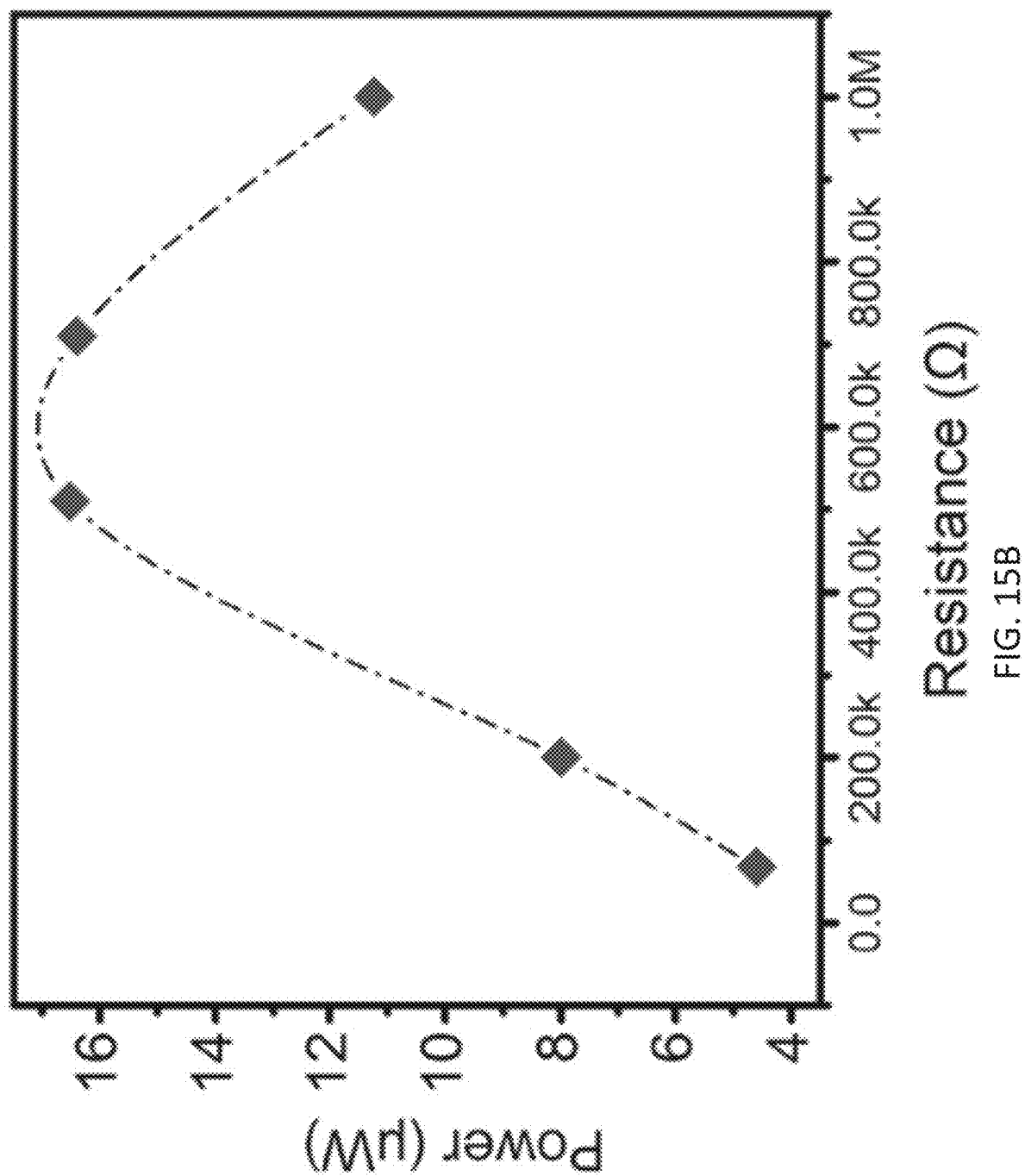
FIG. 15B is a plot showing the output power of the spacer fabric based TENG of FIG. 5A on the load resistance.
Figure 16A:
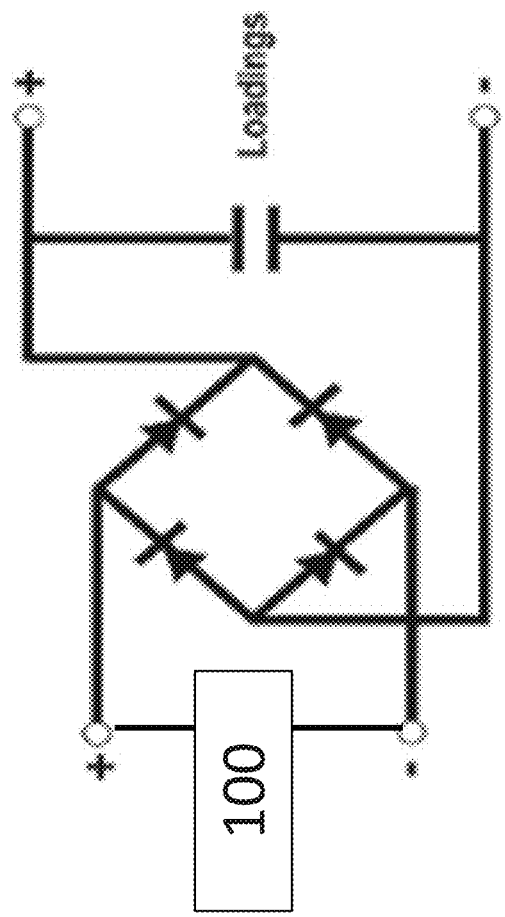
FIG. 16A is a schematic diagram showing a load connected to the electrical apparatus of FIG. 5A via a rectifier circuit.

Preferably, the spacer fabric based TENG may power the electronic devices by the energy harvested from the environment. Therefore, the output performance at different loadings was investigated. With reference to FIG. 15A, there is shown the change of voltage and current when connecting the spacer fabric based TENG with loads of different resistances. It is shown that the voltage increases with the increasing resistance. On the contrary, the current generally decreases from the value of $I_{sc}$ with the increasing resistance. The dependence of power on the load can be calculated using the following equation:

$$P=I^2R$$

where I is the output current and R represents the connected resistance. Referring to FIG. 15B, the power increases at the initial stage but decreases if the resistance becomes too large. The output power can reach the highest value-around 16 µW $cm^{-2}$—on the load resistance of ~0.6 MΩ. In some example embodiments, the spacer fabric based TENG may consist multiple TENG pixels, the output power can be delicately tuned by controlling the number of TENG pixels. In addition, the spacer fabric based TENG is used to power polar devices, in which situation the generated AC signals should be rectified before connecting to the load, as illustrated in the schematic diagram of FIG. 16A.

Figure 16C:
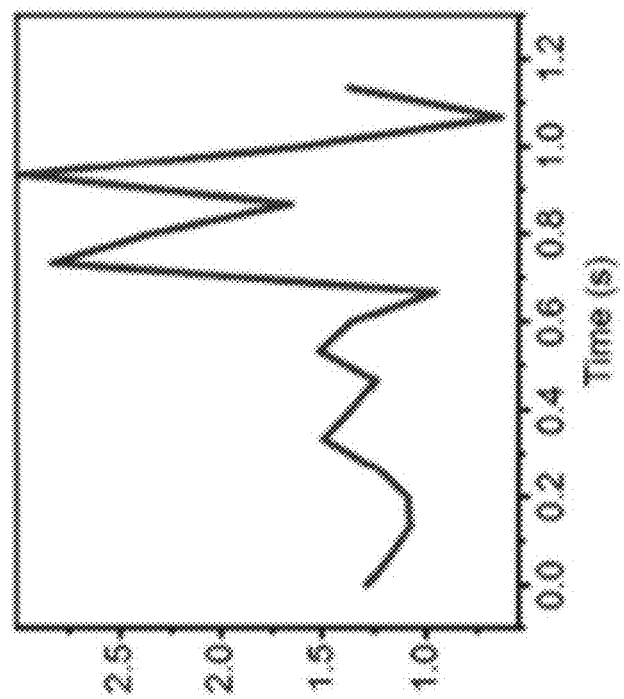
FIG. 16C is a plot showing a single cycle of the output current in FIG. 16B.
Figure 16B:
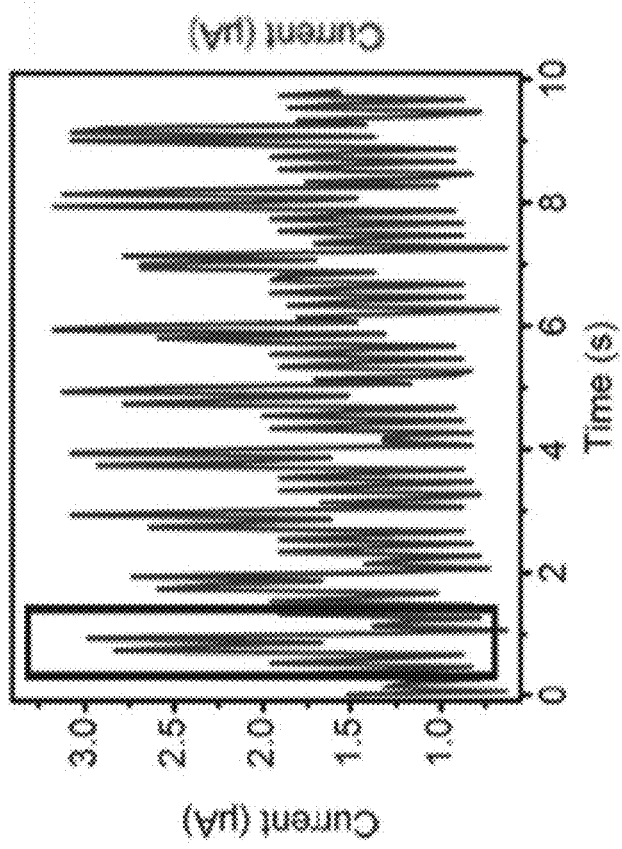
FIG. 16B is a plot showing the output current of the spacer fabric based TENG of FIG. 16A.
Figure 16D:
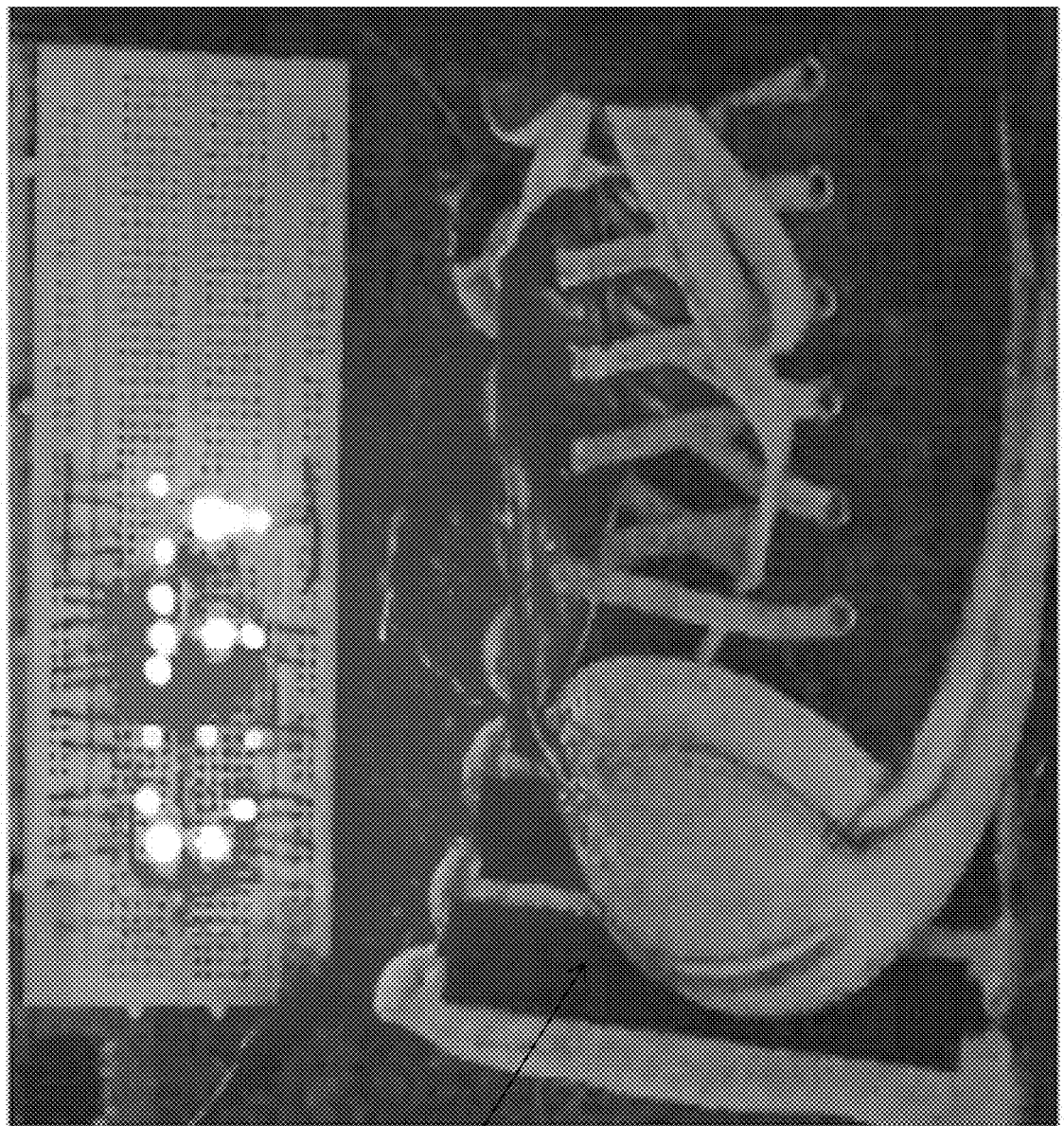
FIG. 16D is a photographic image of the circuit of FIG. 16A which includes a TENG-driven flashing LED array illustrating a pattern of "CITY"

With reference to FIG. 16B, there is shown a current profiles after rectification, showing the output current of whole spacer fabric based TENG can reach around 3.0 µA, and the current profile of a single cycle in the operation is extracted and shown in FIG. 16C.

Figure 19:
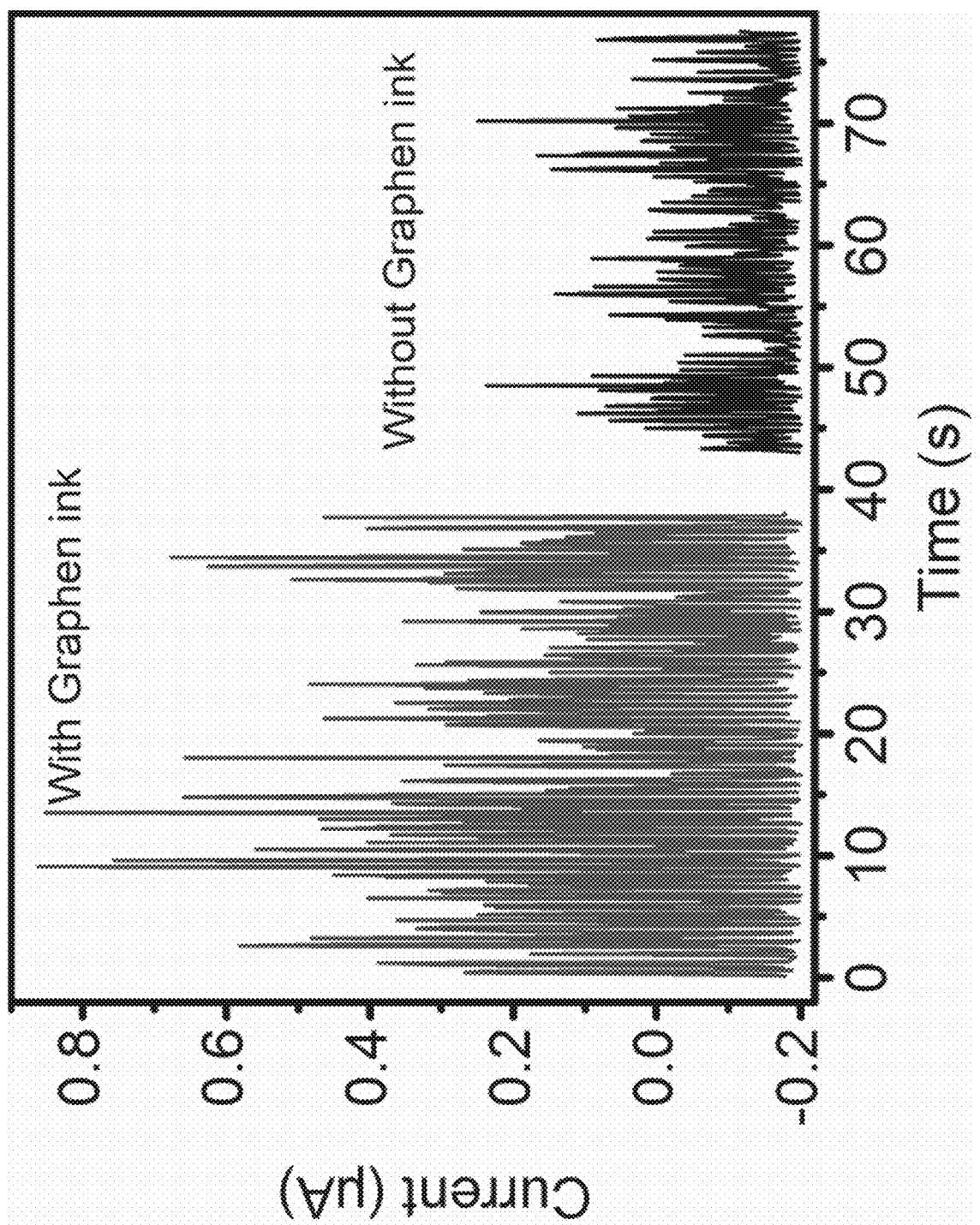
FIG. 19 is plot showing a comparison of the $I_{sc}$ generated by the spacer fabric based TENG of FIG. 1 with graphene coating and without graphene coating.

As an example for the spacer fabric based TENG to be utilized as the power sources, LEDs composing the pattern "CITY" are directly lit up by a human walking as shown in FIG. 19. This demonstrates the powerful ability to transfer the mechanical energy from human walking to the electricity by the spacer fabric based TENG.

In addition to the basic function of transferring the mechanical energy to electricity, the spacer fabric based TENG can serve as self-powered sensors for applications in human movement monitoring and pressure sensor of feet.

The spacer fabric based TENG may be used as the insole of shoes, which not only largely harvests the mechanical energy from the human walking. Moreover, the electric signals, either $V_{oc}$ or $I_{sc}$, can definitely mirror the state of human motions. For example, referring to FIG. 17A, the number of steps can be accurately reflected by the number of generated signals. This is because every step refers to a periodic scenario shown in FIG. 8.

Furthermore, the dependence of $I_{sc}$ on frequencies can effectively denote the mode of the human motions due to the variations in frequency of different modes of human motions. With reference to FIG. 17B, there is shown an $I_{sc}$ profiles recorded at different motion modes. When walking slowly, $I_{sc}$ is relatively small. With the increasing speed of walking, the value of $I_{sc}$ increases accordingly as the frequency of steps becomes larger. The highest value of $I_{sc}$ can be found when the mode changes to running, which can be attributed to the highest frequency of steps for running, as well as that the largest extent of contact between two layers due of human running.

The electrical apparatus 100 may also be functionalized with the ability of foot pressure sensing. Taking the advantages of pixelated design of small TENG arrays, several TENG pixels can be selected as sensors of the foot pressure during the human walking. As appreciated by a skilled person, the pressure of the foot when we are walking is different at different positions.

With reference to FIG. 18, there is shown the pressure of the sole of the foot. The pressure increase with the color changing from black to white. The highest pressure occurs at the heel of the foot (position v), while the lowest pressure locates at the arch of the foot (position iv). Accordingly, the value of $I_{sc}$ generated from the specified TENG pixel exhibits smallest value as seen in FIG. 18-$iv$. On the other hand, the value of $I_{sc}$ shows the largest value from the TENG pixel located at the heel of the foot FIG. 18-*v*. The variations in $I_{sc}$ can be attributed to the extent of contact under different pressures. The higher pressure can result in a tighter contact, which can effectively enhance the triboelectrification so that the more charges will accumulate on the surface of two electrodes. For the outside of the foot, pressures at two positions (ii and iii) are relatively same. As the results, values of $I_{sc}$ are similar as shown in FIG. 18-*ii* and FIG. 18-*iii*. Moreover, the pressure at the position below the big toe is a little bit larger than those at the outside as the color of position below the big toe is white (position i). This little difference is also reflected from the value of $I_{sc}$ generated from the TENG pixel at position i (FIG. 18-*i*), which is a little bit larger than those of position ii and iii. This result further exhibits the excellent sensitivity to the pressure of the spacer fabric based TENG.

With reference to FIG. 19, it is shown that the $I_{sc}$ generated by the spacer fabric based TENG with graphene ink coating and without graphene ink coating. It is shown that the value of $I_{sc}$ generated by the TENG with graphene ink coating is much larger than that of TENG without graphene ink coating, which suggests that coating graphene ink on the upper surface of the nylon layer can greatly enhance the ability of collecting charges generated by the triboelectrification as the conductivity is enhanced.

These embodiments may be advantageous in that the electrical apparatus may be used to harvest the mechanical energy from biological creatures and to convert such energy to a form of electrical energy. This may be an advantage for powering up different electronic devices such as wearable electronic devices, and may effectively reduce the frequency of recharging the electronic devices or may even completely eliminate the need of recharging the electronic devices.

In addition to the ability of transferring the mechanical energy from human motions to electricity, the multi-functionalities of the electrical apparatus or the TENGs is another key pursuit. The achievement of self-powered sensors based TENGs may be used a wide range of applications in motion monitoring and human health caring.

Furthermore, the spacer fabric may be pixelated by small TENG pixel arrays for the convenience of the realization of multi-functionalities in one device. The operation voltage and current of spacer fabric based TENG is in usable ranges for detection as well as for powering up electronic devices. Moreover, the output of the whole fabric based TENG can be delicately tuned by controlling the number of TENG pixels.

The whole spacer fabric based TENG can easily power the light-emitting diodes (LEDs), showing the excellent ability in transferring mechanical energy to electricity. In addition to the basic performance as the power source, the spacer fabric based TENG may also be implemented as a self-powered monitoring system to track and identify the human motions. It may in situ sense the pressure of the foot during human walking with high sensitivity.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An electrical apparatus comprising an electrical signal generation structure arranged to generate an electrical signal in response to a change of an external pressure subjected thereto, wherein the electrical signal generation structure includes:
   a pair of electrical signal generation layers arranged to generate an electrical signal by triboelectrification in response to a relative movement between the pair of electrical signal generation layers, wherein the pair of electrical signal generation layers includes a first layer of material and a second layer of material, and wherein the first and second layers of material are arranged to exchange electrical charges when in contact with each other;
   a spacer layer arranged to electrically separate the first and second layer of materials, wherein the spacer layer includes a resilient structure connecting the first and the second layers of material, and wherein when the electrical signal generation structure is subjected to the external pressure, the resilient structure is arranged to be compressed, upon which the first and the second layers of material are brought in contact with each other; and when the external pressure is removed, the resilient structure is arranged to be released, upon which the first and the second layers of material are brought away from each other.

2. The electrical apparatus in accordance with claim 1, wherein the pair of electrical signal generation layers are oppositely charged.

3. The electrical apparatus in accordance with claim 2, wherein the pair of electrical signal generation layers are arranged to receive electrical charges when upon each layer of the pair of electrical signal generation layers are in contact with each other.

4. The electrical apparatus in accordance with claim 3, wherein an electric potential difference is established between the pair of electrical signal generation layers when each layer of the pair of the electrical signal generation layers are separated from each other after the reception of electrical charges in each of the layers.

5. The electrical apparatus in accordance with claim 2, wherein the pair of electrical signal generation layers are charged by triboelectrification.

6. The electrical apparatus in accordance with claim 1, wherein the first and the second layers of materials include different electron affinities and/or tribo-polarity.

7. The electrical apparatus in accordance with claim 1, wherein the first layer of material includes a coating layer of polytetrafluoroethylene.

8. The electrical apparatus in accordance with claim 7, wherein the first layer of material is arranged to receive electrons from the second layer of material.

9. The electrical apparatus in accordance with claim 1, wherein the second layer of material includes a coating layer of graphene.

10. The electrical apparatus in accordance with claim 9, wherein the coating layer of graphene is arranged to collect the electrical charges generated in the second layer of material.

11. The electrical apparatus in accordance with claim 1, wherein the first and the second layers of material are integrated to the spacer layer.

12. The electrical apparatus in accordance with claim 1, wherein the fabric material includes nylon.

13. The electrical apparatus in accordance with claim 1, wherein the electrical signal generation structure includes a plurality of pixels on the pair of electrical signal generation layers.

14. The electrical apparatus in accordance with claim 1, wherein the electrical signal is arranged to power at least one electrical component connected thereto.

15. The electrical apparatus in accordance with claim 1, wherein the electrical signal is arranged to represent the change of the external pressure subjected by the electrical signal generation structure.

16. The electrical apparatus in accordance with claim 1, wherein the electrical signal generation structure is provided on a wearable item.

17. The electrical apparatus in accordance with claim 1, wherein the electrical signal is arranged to represent a motion of an object identified by the electrical signal generation structure.

18. A method for fabricating an electrical apparatus in accordance with claim 1, comprising the steps of:
   providing a first electrical signal generation layer and a second electrical signal generation layer; and
   connecting the first and the second signal generation layer by defining the spacer layer between the first and the second signal generation layers.

19. The method for fabricating an electrical apparatus in accordance with claim 18, wherein the spacer layer is defined by knitting of the fabric material between the first and the second signal generation layers.

20. The method for fabricating an electrical apparatus in accordance with claim 18, wherein the step of providing a first electrical signal generation layer and a second electrical signal generation layer comprises the step of knitting the fabric material to define the first signal generation layer and the second signal generation layer.

21. The method for fabricating an electrical apparatus in accordance with claim 18, wherein at least one of the first signal generation layer, the second signal generation layer and the spacer layer is produced by a flat knitting machine.

22. The method for fabricating an electrical apparatus in accordance with claim 18, further comprising the steps of:
   coating the first layer of material on the first signal generation layer; and/or
   coating the second layer of material on the second signal generation layer.

* * * * *